US011054721B2

(12) United States Patent
Aoki

(10) Patent No.: US 11,054,721 B2
(45) Date of Patent: Jul. 6, 2021

(54) IMAGING DEVICE, FOCUSING ASSISTANCE METHOD THEREOF, AND FOCUSING ASSISTANCE PROGRAM THEREOF

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/997,914

(22) Filed: Aug. 19, 2020

(65) Prior Publication Data
US 2020/0379317 A1 Dec. 3, 2020

Related U.S. Application Data

(63) Continuation of application No. PCT/JP2019/002045, filed on Jan. 23, 2019.

(30) Foreign Application Priority Data

Feb. 27, 2018 (JP) .............................. JP2018-033450

(51) Int. Cl.
G03B 13/36 (2021.01)
G02B 7/28 (2021.01)
(Continued)

(52) U.S. Cl.
CPC ............. G03B 13/36 (2013.01); G02B 7/282 (2013.01); G03B 13/18 (2013.01); H04N 5/2252 (2013.01)

(58) Field of Classification Search
CPC . G02B 7/28; G02B 7/282; G02B 7/34; G02B 7/36; G03B 13/18; G03B 13/32;
(Continued)

(56) References Cited

U.S. PATENT DOCUMENTS 5,140,357 A * 8/1992 Suda ...................... G02B 7/282
348/347
9,420,164 B1 * 8/2016 Galor Gluskin ..........................
H01L 27/14645
(Continued)

FOREIGN PATENT DOCUMENTS

JP 2008176242 7/2008
JP 2010243922 10/2010
(Continued)

OTHER PUBLICATIONS

"International Search Report (Form PCT/ISA/210) of PCT/JP2019/002045," dated Apr. 9, 2019, with English translation thereof, pp. 1-4.
(Continued)

Primary Examiner — Joseph P Martinez
Assistant Examiner — Vipin Patel
(74) Attorney, Agent, or Firm — JCIPRNET

(57) ABSTRACT

Provided are an imaging device capable of assisting focusing without giving uncomfortable feeling, a focusing assistance method thereof, and a focusing assistance program thereof. In a case where manual focusing is assisted by moving an image sensor, a focus adjustment speed by an imaging lens is detected. In a case where the focus adjustment speed by the imaging lens is reduced to a threshold value or less, the assistance is started by moving the image sensor. At this time, a focusing assistance unit is brought into an in-focus state by controlling the movement of the image sensor such that the sum of the focus adjustment speed by the imaging lens and a focus adjustment speed by the movement of the image sensor is set to a speed equal to or less than the threshold value.

14 Claims, 17 Drawing Sheets

(51) Int. Cl.
*G03B 13/18* (2021.01)
*H04N 5/225* (2006.01)

(58) Field of Classification Search
CPC ........ G03B 13/34; G03B 13/36; G03B 17/14; H04N 5/225; H04N 5/2252; H04N 5/232
See application file for complete search history.

(56) References Cited

U.S. PATENT DOCUMENTS

| | | |
|---|---|---|
| 2015/0323760 A1 | 11/2015 | Tomosada |
| 2016/0234422 A1 | 8/2016 | Inata et al. |
| 2016/0255267 A1 | 9/2016 | Takamiya |
| 2017/0289436 A1* | 10/2017 | Katsuyama ...... H04N 5/232123 |
| 2018/0129014 A1* | 5/2018 | Okawa .................... G03B 3/10 |

FOREIGN PATENT DOCUMENTS

| | | |
|---|---|---|
| JP | 2015215371 | 12/2015 |
| JP | 2016148832 | 8/2016 |
| JP | 2016157093 | 9/2016 |
| JP | 2016218161 | 12/2016 |
| JP | 2017182054 | 10/2017 |

OTHER PUBLICATIONS

"Written Opinion of the International Searching Authority (Form PCT/ISA/237) of PCT/JP2019/002045," dated Apr. 9, 2019, with English translation thereof, pp. 1-8.

\* cited by examiner

IMAGING DEVICE, FOCUSING ASSISTANCE METHOD THEREOF, AND FOCUSING ASSISTANCE PROGRAM THEREOF

CROSS-REFERENCE TO RELATED APPLICATIONS

The present application is a Continuation of PCT International Application No. PCT/JP2019/002,045 filed on Jan. 23, 2019 claiming priority under 35 U.S.C § 119(a) to Japanese Patent Application No. 2018-033,450 filed on Feb. 27, 2018. Each of the above applications is hereby expressly incorporated by reference, in its entirety, into the present application.

BACKGROUND OF THE INVENTION

1. Field of the Invention

The present invention relates to focusing of an imaging device.

2. Description of the Related Art

In an imaging device having no auto focus (AF) function, focusing is manually performed. Even in the imaging device having the AF function, the AF function may be turned off, and a user may manually perform the focusing.

JP2008-176242A describes a technology of achieving an in-focus state by automatically operating the AF in a case where a manual focus adjustment state is almost the in-focus state as a function of assisting manual focusing.

JP2016-148832A describes a technology of performing contrast AF by moving an image sensor back and forth in a case where the user presses an AF button after manually adjusting a focus.

SUMMARY OF THE INVENTION

However, there is a disadvantage that JP2008-176242A cannot be applied to an imaging device configured to manually move a focus lens group such as an old lens since the in-focus state is achieved by moving the focus lens group.

Since JP2008-176242A does not consider a focus adjustment speed in the case of achieving the in-focus state, there is a disadvantage that a viewfinder and live view display during focusing are unnatural.

Meanwhile, since JP2016-148832A needs to operate the AF button, there is a disadvantage that quick focusing cannot be performed. In particular, there is a disadvantage that the focusing does not effectively function in a case where a moving body is captured.

The present invention has been made in view of such circumstances, and an object of the present invention is to provide an imaging device capable of assisting focusing without feeling uncomfortable, a focusing assistance method thereof, and a focusing assistance program thereof.

Means for solving the aforementioned problems are as follows.

(1) There is provided an imaging device comprising an imaging lens that is capable of adjusting a focus, an image sensor, a focusing assistance unit that assists focusing by moving the image sensor, a focus adjustment speed detection unit that detects a focus adjustment speed by the imaging lens, a focus state detection unit that detects a focus state, and a focusing assistance controller that brings the focusing assistance unit into an in-focus state by controlling the focusing assistance unit based on a detection result of the focus state detection unit in a case where the focus adjustment speed by the imaging lens is reduced to a threshold value or less, the focusing assistance controller bringing the focusing assistance unit into the in-focus state by setting a sum of the focus adjustment speed by the imaging lens and a focus adjustment speed by movement of the image sensor to a speed equal to or less than the threshold value.

According to the present aspect, in a case where the focus adjustment speed by the imaging lens is reduced to the threshold value or less, the focusing is assisted by moving the image sensor. At this time, the focusing assistance unit is brought into the in-focus state by controlling the focusing assistance unit such that the sum of the focus adjustment speed by the imaging lens and the focus adjustment speed by the movement of the image sensor is set to the speed equal to or less than the threshold value. Accordingly, the focusing assistance unit can be naturally brought into the in-focus state without giving the user uncomfortable feeling. Since the focusing is assisted by the movement of the image sensor, appropriate focusing can be assisted even in a case where the old lens is used. It is possible to prevent so-called overfocus by moving the image sensor according to the driving of the focus of the user.

(2) In the imaging device according to (1), the focusing assistance controller brings the focusing assistance unit into the in-focus state by maintaining the sum of the focus adjustment speed by the imaging lens and the focus adjustment speed by the movement of the image sensor at a speed of the threshold value.

According to the present aspect, in a case where the focusing assistance unit is brought into the in-focus state, the focusing assisting unit is controlled such that the sum of the focus adjustment speed by the imaging lens and the focus adjustment speed by the movement of the image sensor is maintained at the speed of the threshold value. Accordingly, the focusing assistance unit can be naturally brought into the in-focus state without giving the user uncomfortable feeling.

(3) In the imaging device according to (1), the focusing assistance controller brings the focusing assistance unit into the in-focus state by gradually decreasing the sum of the focus adjustment speed by the imaging lens and the focus adjustment speed by the movement of the image sensor.

According to the present aspect, in a case where the focusing assistance unit is brought into the in-focus state, the focusing assistance unit is controlled such that the sum of the focus adjustment speed by the imaging lens and the focus adjustment speed by the movement of the image sensor gradually decreases. Accordingly, the focusing assistance unit can be naturally brought into the in-focus state without giving the user uncomfortable feeling.

(4) In the imaging device according to (3), the focusing assistance controller brings the focusing assistance unit into the in-focus state by monotonically decreasing the sum of the focus adjustment speed by the imaging lens and the focus adjustment speed by the movement of the image sensor.

According to this aspect, in a case where the focusing assistance unit is brought into the in-focus state, the focusing assistance unit is controlled such that the sum of the focus adjustment speed by the imaging lens and the focus adjustment speed by movement of the image sensor monotonically decreases. Accordingly, the focusing assistance unit can be naturally brought into the in-focus state without giving the user uncomfortable feeling.

(5) In the imaging device according to any one of (1) to (4), the focusing assistance controller brings the focusing assistance unit into the in-focus state by controlling the focusing assistance unit based on the detection result of the focus state detection unit in a case where an average value of the focus adjustment speed by the imaging lens is reduced to the threshold value or less.

According to the present aspect, in a case where the average value of the focus adjustment speed by the imaging lens is reduced to the threshold value or less, the focusing is assisted by moving the image sensor. Since manual focusing is difficult to be constant, stable control can be performed by using the averaged value.

(6) In the imaging device according to any one of (1) to (5), the focus state detection unit detects a defocus amount, and in a case where the focus adjustment speed by the imaging lens is reduced to the threshold value or less and the defocus amount detected by the focus state detection unit becomes equal to or less than a prescribed value, the focusing assistance controller brings the focusing assistance unit into the in-focus state by controlling the focusing assistance unit based on the detection result of the focus state detection unit.

According to the present aspect, in a case where the focus adjustment speed by the imaging lens is reduced to the threshold value or less and the defocus amount becomes equal to or less than the prescribed value, the focusing is assisted by moving the image sensor. It is difficult to manually adjust the focus while maintaining the speed at a constant speed. Thus, in a case where the focus adjustment speed by the imaging lens is reduced to the threshold value or less and the defocus amount becomes equal to or less than the prescribed value, the assistance is started, and thus, the assistance can be started more appropriately.

(7) In the imaging device according to (6), in a case where the defocus amount detected by the focus state detection unit becomes equal to or less than the prescribed value after the focus adjustment speed by the imaging lens becomes equal to or less than the threshold value, the focusing assistance controller brings the focusing assistance unit into the in-focus state by setting the sum of the focus adjustment speed by the imaging lens and the focus adjustment speed by the movement of the image sensor to a speed equal to or less than the speed detected by the focus adjustment speed detection unit in a case where the defocus amount detected by the focus state detection unit reaches the prescribed value.

According to the present aspect, in a case where the defocus amount becomes equal to or less than the prescribed value after the focus adjustment speed by the imaging lens becomes equal to or less than the threshold value, the focusing assistance unit is brought into the in-focus state by setting the to the speed equal to or less than the focus adjustment speed in a case where the defocus amount reaches the prescribed value. Accordingly, the focusing assistance unit can be naturally brought into the in-focus state without giving the user uncomfortable feeling.

(8) In the imaging device according to (7), the focusing assistance controller brings the focusing assistance unit into the in-focus state by gradually decreasing the sum of the focus adjustment speed by the imaging lens and the focus adjustment speed by the movement of the image sensor.

According to the present aspect, in a case where the focusing assistance unit is brought into the in-focus state, the focusing assistance unit is controlled such that the sum of the focus adjustment speed by the imaging lens and the focus adjustment speed by the movement of the image sensor gradually decreases. Accordingly, the focusing assistance unit can be naturally brought into the in-focus state without giving the user uncomfortable feeling.

(9) In the imaging device according to (8), the focusing assistance controller brings the focusing assistance unit into the in-focus state by monotonically decreasing the sum of the focus adjustment speed by the imaging lens and the focus adjustment speed by the movement of the image sensor.

According to this aspect, in a case where the focusing assistance unit is brought into the in-focus state, the focusing assistance unit is controlled such that the sum of the focus adjustment speed by the imaging lens and the focus adjustment speed by movement of the image sensor monotonically decreases. Accordingly, the focusing assistance unit can be naturally brought into the in-focus state without giving the user uncomfortable feeling.

(10) In the imaging device according to any one of (1) to (9), the image sensor comprises a phase difference detection pixel on an imaging surface, and the focus state detection unit detects the focus state based on a phase difference calculated based on a signal obtained from the phase difference detection pixel.

According to the present aspect, the phase difference detection pixel is provided on the imaging surface of the image sensor, and the phase difference can be detected simultaneously with the imaging. Accordingly, the configuration can be simplified.

(11) In the imaging device according to any one of (1) to (10), the focus adjustment speed detection unit detects the focus adjustment speed by the imaging lens based on a moving speed of a focus lens group that moves by focus adjustment.

According to the present aspect, the focus adjustment speed by the imaging lens is detected based on the moving speed of the focus lens group that moves by focus adjustment.

(12) In the imaging device according to any one of (1) to (10), the focus adjustment speed detection unit detects the focus adjustment speed by the imaging lens based on a change in focus state detected by the focus state detection unit.

According to the present aspect, the focus adjustment speed by the imaging lens is detected based on the change in the focus state detected by the focus state detection unit.

(13) In the imaging device according to any one of (1) to (12), the imaging lens is attachable to and detachable from a main body.

According to the present aspect, the imaging lens is attachable to and detachable from the main body. Accordingly, the lens can be replaced.

(14) There is provided a focusing assistance method of an imaging device comprising a step of detecting a focus state, a step of detecting a focus adjustment speed by an imaging lens, and a step of bringing a focusing assistance unit into an in-focus state by controlling movement of an image sensor based on a detection result of a focus state in a case where the focus adjustment speed by the imaging lens is reduced to a threshold value or less, the focusing assistance unit being brought into the in-focus state by setting a sum of the focus adjustment speed by the imaging lens and a focus adjustment speed by the movement of the image sensor to a speed equal to or less than the threshold value.

According to the present aspect, in a case where the focus adjustment speed by the imaging lens is reduced to the threshold value or less, the focusing is assisted by moving the image sensor. That is, in a case where the speed is reduced to a predetermined speed, it is determined that the focusing assistance unit approaches the in-focus state, and the focusing assistance is started. At this time, the focusing assistance unit is brought into the in-focus state by being controlled such that the sum of the focus adjustment speed by the imaging lens and the focus adjustment speed by the movement of the image sensor is set to the speed equal to or less than the threshold value. Accordingly, the focusing assistance unit can be naturally brought into the in-focus state without giving the user uncomfortable feeling.

(15) There is provided a focusing assistance program of an imaging device causing a computer to realize a function of acquiring a detection result of a focus state, a function of acquiring a detection result of a focus adjustment speed by an imaging lens, and a function of bringing a focusing assistance unit into an in-focus state by controlling movement of an image sensor based on the detection result of the focus state in a case where the focus adjustment speed by the imaging lens is reduced to a threshold value or less, the focusing assistance unit being brought into the in-focus state by setting a sum of the focus adjustment speed by the imaging lens and the focus adjustment speed by the movement of the image sensor to a speed equal to or less than the threshold value.

According to the present aspect, in a case where the focus adjustment speed by the imaging lens is reduced to the threshold value or less, the focusing is assisted by moving the image sensor. That is, in a case where the speed is reduced to a predetermined speed, it is determined that the focusing assistance unit approaches the in-focus state, and the focusing assistance is started. At this time, the focusing assistance unit is brought into the in-focus state by being controlled such that the sum of the focus adjustment speed by the imaging lens and the focus adjustment speed by the movement of the image sensor is set to the speed equal to or less than the threshold value. Accordingly, the focusing assistance unit can be naturally brought into the in-focus state without giving the user uncomfortable feeling.

According to the present invention, the focusing can be assisted without giving the uncomfortable feeling.

DESCRIPTION OF THE PREFERRED EMBODIMENTS

Hereinafter, preferred embodiments for carrying out the present invention will be described in detail with reference to the accompanying drawings.

First Embodiment

[Appearance Configuration of Digital Camera]

Figure 1:
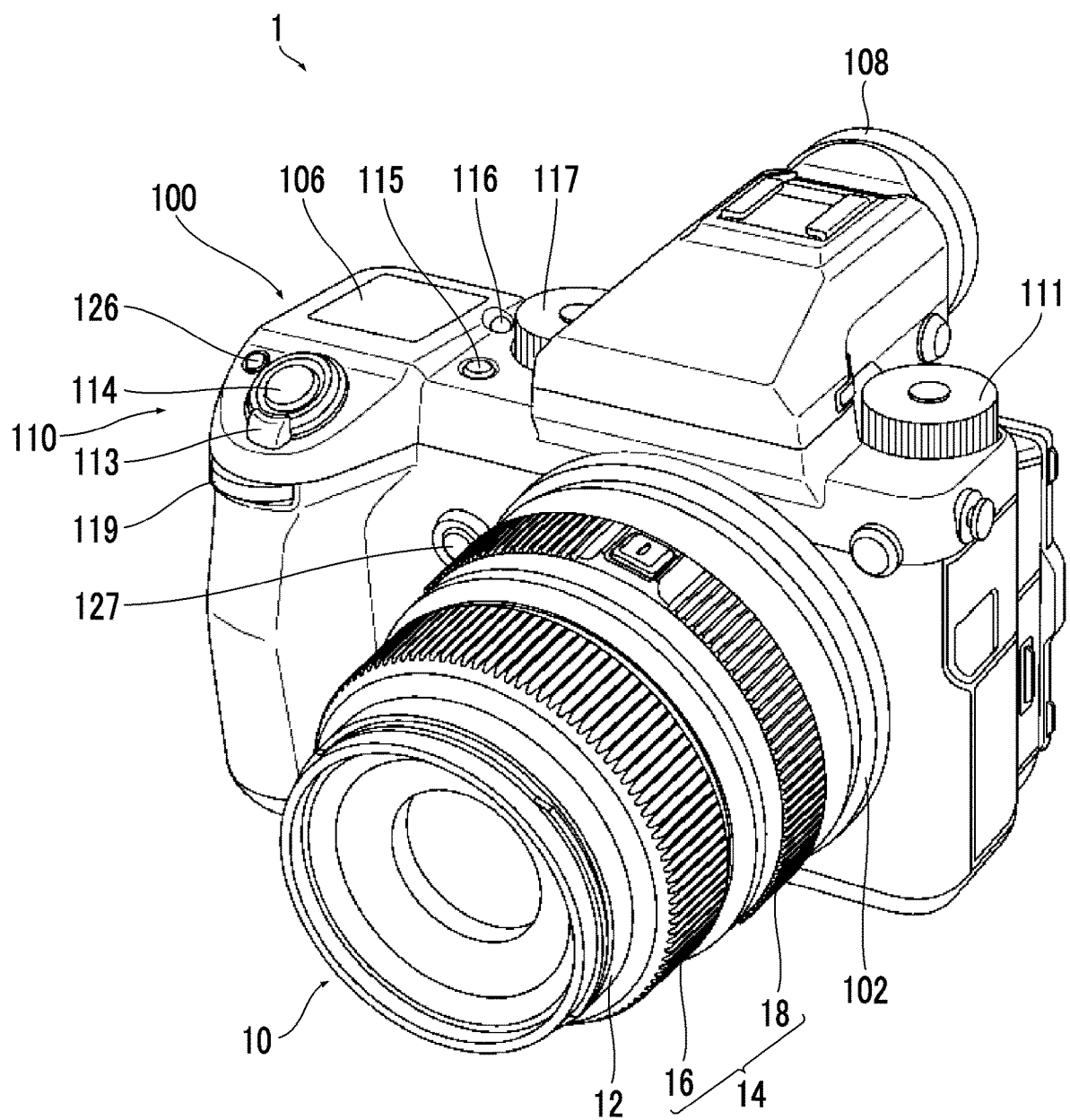
FIG. 1 is a front perspective view showing an embodiment of a digital camera.
Figure 2:
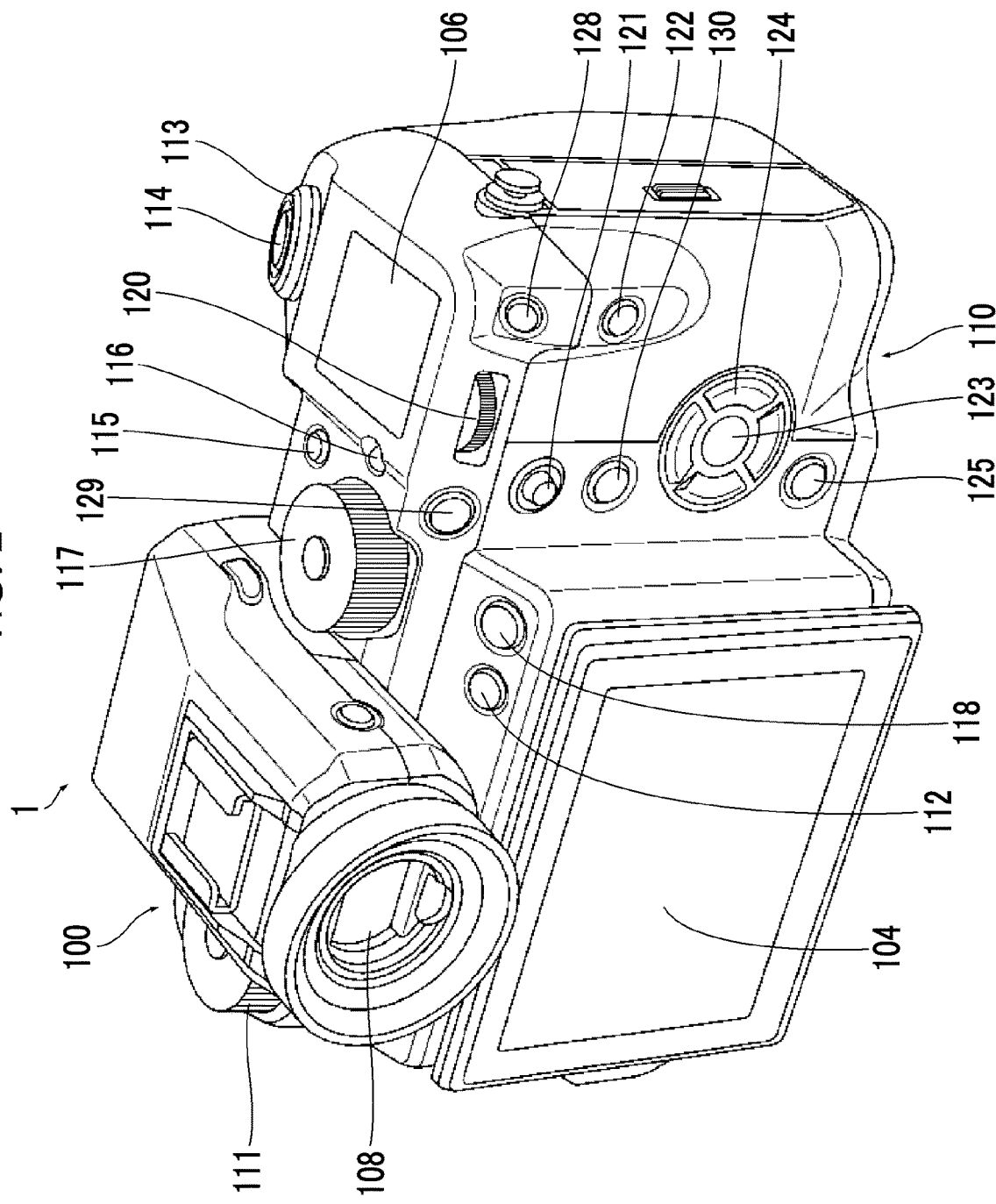
FIG. 2 is a rear perspective view showing the embodiment of the digital camera.
Figure 3:
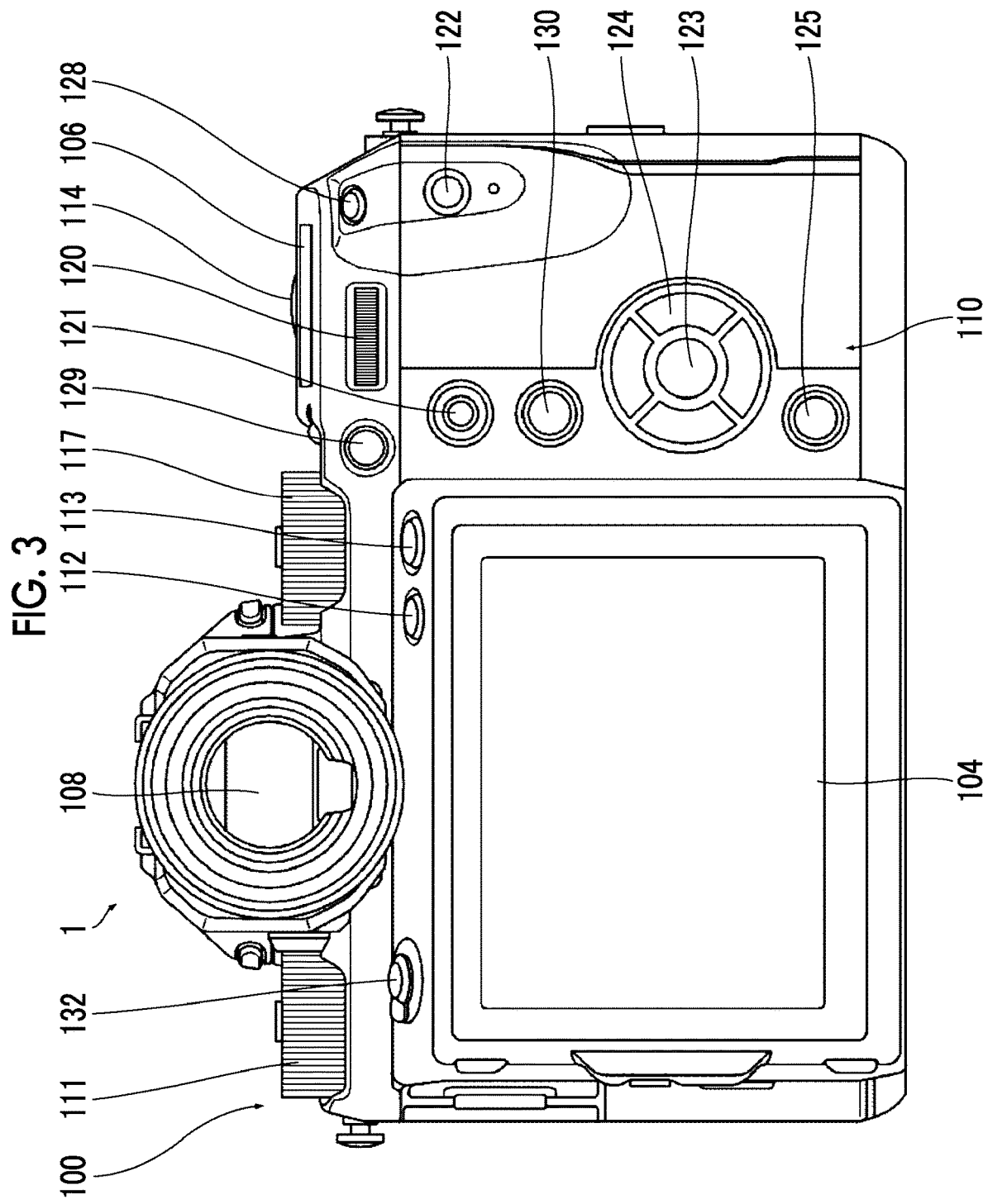
FIG. 3 is a rear perspective view showing the embodiment of the digital camera.

FIGS. 1 to 3 are a front perspective view, a rear perspective view, and a rear view showing an embodiment of a digital camera to which the present invention is applied.

A digital camera 1 shown in FIGS. 1 to 3 is an interchangeable lens type digital camera, and comprises an interchangeable lens 10 and a camera main body 100. The digital camera 1 is an example of an imaging device.

<<Appearance Configuration of Interchangeable Lens>>

The interchangeable lens 10 is an example of an imaging lens. A plurality of interchangeable lenses 10 having different specifications is prepared. Each interchangeable lens 10 comprises a lens side mount (not shown) at a base end portion of a lens barrel 12, and is attachable and detachable to and from the camera main body 100 via the lens side mount. Each interchangeable lens 10 comprises at least a focus adjustment mechanism and a stop, and is configured to be capable of performing focus adjustment and light amount adjustment.

In FIG. 1, an example of the interchangeable lens 10 comprising a focus ring 16 and a stop ring 18 is illustrated as a lens operation unit 14.

The focus ring 16 is an operation member for focus adjustment, and is provided to be rotatable around the lens barrel 12. In a case where the focus ring 16 is rotated, a focus adjustment mechanism is operated according to an operation direction, an operation amount, and an operation speed. That is, the focus lens group moves according to the operation direction, the operation amount, and the operation speed, and the focus is adjusted.

The stop ring 18 is an operation member for stop adjustment, and is provided to be rotatable around the lens barrel 12. F numbers capable of being set on an outer periphery of the stop ring 18 are printed at regular intervals (not shown). The setting of the stop is performed by rotating the stop ring 18 and adjusting the F number desired to be set at a position of an index (not shown) provided on the lens barrel 12.

<<Appearance Configuration of Camera Main Body>>

A camera main body 100 is an example of an imaging device main body. The camera main body 100 comprises a main body side mount 102, a main monitor 104, a sub monitor 106, an electronic viewfinder 108, and a camera operation unit 110.

The main body side mount 102 is an attachment unit of the interchangeable lens 10, and is provided on a front surface of the camera main body 100. The interchangeable lens 10 is attachable and detachable to and from the main body side mount 102.

The main monitor 104 is provided on a rear surface of the camera main body 100. The main monitor 104 includes a liquid crystal display (LCD). The main monitor 104 is used as a graphical user interface (GUI) in the case of performing various settings, and is also used as a monitor for reproducing captured images. In the case of imaging, a live view is displayed as necessary, and an image captured by an image sensor is displayed in real time.

The sub monitor 106 is provided on an upper surface of the camera main body 100. The sub monitor 106 includes an LCD. The sub monitor 106 displays main imaging information such as shutter speed, an F number, sensitivity, and exposure correction.

The electronic viewfinder (EVF) 108 is provided on an upper portion of the camera main body 100. The live view is displayed on the electronic viewfinder 108, and the image captured by the image sensor in real time is displayed. The electronic viewfinder 108 can be turned on and off as necessary, and can be switched to the display of the main monitor 104.

The camera operation unit 110 comprises, as operation members of the digital camera 1, a sensitivity dial 111, a delete button 112, a power lever 113, a shutter button 114, a drive button 115, a sub monitor illumination button 116, a shutter speed dial 117, a playback button 118, a front command dial 119, a rear command dial 120, a focus lever 121, a quick menu button 122, a menu/OK button 123, a selector button 124, a display/BACK button 125, a first function button 126, a second function button 127, a third function button 128, a fourth function button 129, a fifth function button 130, and a focus mode switching lever 132.

The sensitivity dial 111 is a dial for setting sensitivity. The delete button 112 is a button for deleting the captured image. In a case where the button is pushed during the reproduction of the image, the image being reproduced is deleted. The power lever 113 is a lever that turns on and off the power of the digital camera 1. The shutter button 114 is a button for instructing recording of an image. The shutter button 114 is a two-stroke button capable of being pushed halfway and fully. In a case where the shutter button 114 is pushed halfway, an S1ON signal is output, and in a case where the shutter button is pushed fully, an S2ON signal is output. In a case where a still image is captured, imaging preparation is performed by pushing the shutter button 114 halfway, and image recording is performed by fully pushing the shutter button. In a case where a motion picture is captured, imaging is started by fully pushing the shutter button 114 for the first time, and imaging is ended by fully pushing the shutter button 114 for the second time. The drive button 115 is a button for calling a selection screen of a drive mode. In a case where the drive button 115 is pushed, the selection screen of the drive mode is displayed on the main monitor 104. The drive mode is selected on the selection screen of the drive mode, and single frame imaging, continuous imaging, bracket imaging, multiple exposures, and motion picture imaging are selected. The sub monitor illumination button 116 is a button for turning on and off the illumination of the sub monitor 106. The shutter speed dial 117 is a dial for setting the shutter speed. The playback button 118 is a button for instructing switching to the playback mode. In a case where the digital camera 1 is activated in an imaging mode and the playback button 118 is pushed, the digital camera is switched to the playback mode. In a case where the shutter button 114 is pushed in the playback mode, the mode is switched to the imaging mode. Functions corresponding to states of the digital camera 1 are assigned to the front command dial 119 and the rear command dial 120. The focus lever 121 is a lever that selects an AF area. The quick menu button 122 is a button for calling a quick menu. In a case where the quick menu button 122 is pushed, the quick menu is displayed on the main monitor 104. In the quick menu, items registered by a user among items capable of being set in the digital camera 1 are displayed. The menu/OK button 123 is a button for calling a menu screen. In a case where the menu/OK button 123 is pushed, the menu screen is displayed on the main monitor 104. The menu/OK button 123 also functions as a button for confirming a selected item. The selector button 124 is a so-called cross button, and is a button capable of instructing in four directions. In a case where various settings are performed, the selector button 124 is used to select an item. The display/BACK button 125 is a button for switching between display contents of the main monitor 104. The display/BACK button 125 also functions as a button for canceling the selected item, that is, a button for returning to the previous state. Functions selected by the user from among functions prepared in advance are assigned to the first function button 126, the second function button 127, the third function button 128, the fourth function button 129, and the fifth function button 130. For example, a function of turning on and off an assistance function of focusing is assigned. The focus mode switching lever 132 is a lever that switches a focus mode. The focus mode switching lever 132 of the digital camera 1 switches the focus mode between an auto focus (AF) mode (AF mode) and a manual focus (MF) mode (MF mode).

[Electric Configuration of Digital Camera]

Figure 4:
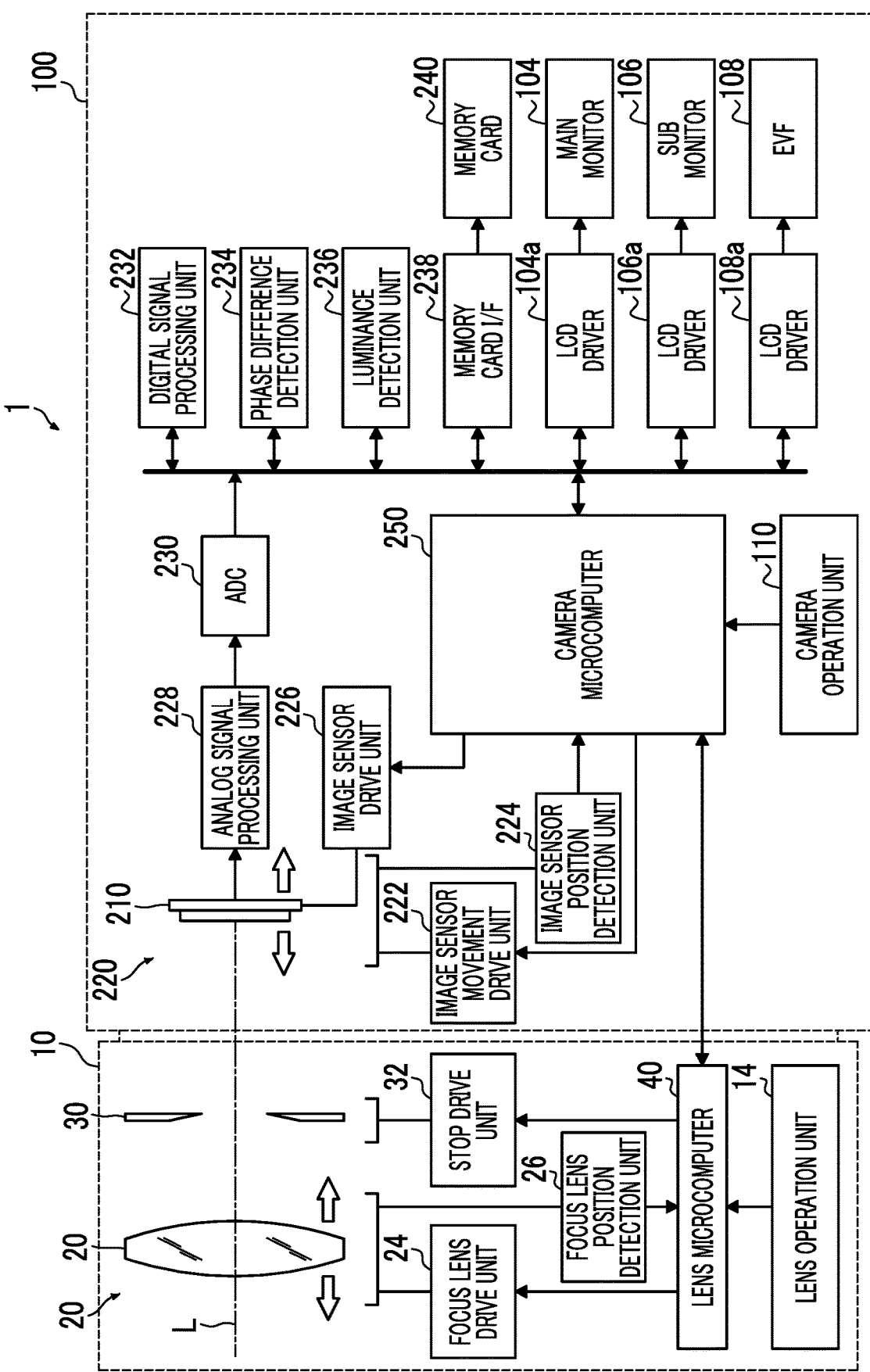
FIG. 4 is a block diagram showing an electric configuration of the digital camera.

FIG. 4 is a block diagram showing an electric configuration of the digital camera.

<<Electric Configuration of Interchangeable Lens>>

As shown in FIG. 4, the interchangeable lens 10 comprises a lens side focus adjustment mechanism 20 that performs focus adjustment, a stop 30 that performs light amount adjustment, a lens operation unit 14 that operates the interchangeable lens 10, and a lens microcomputer 40 that controls an operation of the interchangeable lens 10.

<Lens Side Focus Adjustment Mechanism>

The lens side focus adjustment mechanism 20 of the interchangeable lens 10 adjusts a focus by moving a focus lens group 22 back and forth along an optical axis L. The focus lens group 22 is composed of a part or all of lens groups composing the interchangeable lens 10.

In the interchangeable lens 10 according to the present embodiment, the focus lens group 22 is driven by a focus lens drive unit 24, and moves along the optical axis L. The focus lens drive unit 24 comprises an actuator that drives the focus lens group 22, and a drive circuit thereof. The actuator is constituted by, for example, a linear motor.

A position of the focus lens group 22 is detected by a focus lens position detection unit 26. The focus lens position detection unit 26 includes, for example, a photo interrupter and a magneto resistive (MR) sensor. The photo interrupter detects that the focus lens group 22 is located at an origin position. The MR sensor detects the amount of movement of the focus lens group 22. The MR sensor can detect the position of the focus lens group 22 relative to the origin position by detecting that the focus lens group 22 is located at the origin position by the photo interrupter and detecting the amount of movement of the focus lens group 22 from the origin position by the MR sensor.

<Stop>

The stop 30 is, for example, an iris stop. The stop 30 is driven by a stop drive unit 32, and an opening diameter (F number) changes. The stop drive unit 32 comprises an actuator and a drive circuit thereof.

<Lens Operation Unit>

The lens operation unit 14 outputs a signal corresponding to an operation of each operation member provided in the lens barrel 12 to the lens microcomputer 40. For example, a signal corresponding to the operation direction, the operation amount, and the operation speed of the focus ring 16 is output to the lens microcomputer 40. A signal corresponding to the setting of the stop ring 18 is output to the lens microcomputer 40.

<Lens Microcomputer>

The lens microcomputer 40 is a microcomputer comprising a central processing unit (CPU), a read only memory (ROM), a random access memory (RAM), and functions as a controller of the interchangeable lens 10 by executing a predetermined program.

Figure 5:
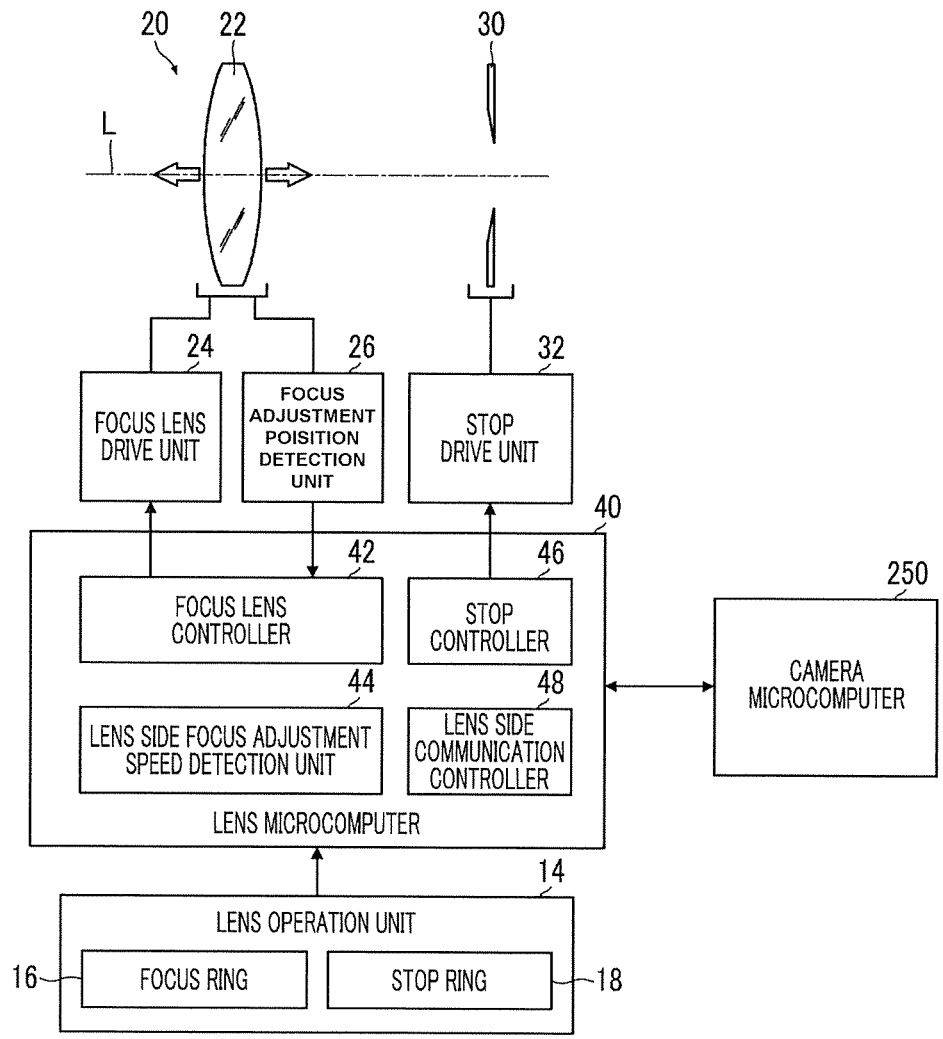
FIG. 5 is block diagram of main functions realized by a lens microcomputer.

FIG. 5 is a block diagram of main functions realized by the lens microcomputer.

The lens microcomputer 40 functions as a focus lens controller 42, a stop controller 46, and a lens side communication controller 48 by executing a predetermined program.

The focus lens controller 42 controls the movement of the focus lens group 22 by controlling the driving of the focus lens drive unit 24 based on an operation of the focus ring 16 or a command from the camera main body 100. In a case where the focus mode of the camera is set to manual focus, the focus lens controller 42 controls the movement of the focus lens group 22 based on the operation of the focus ring 16. Specifically, the focus lens group 22 is moved in a direction corresponding to the operation of the focus ring 16, a speed corresponding to the operation, and the amount of movement corresponding to the operation. In a case where the focus mode of the camera is set to auto focus, the focus lens controller 42 moves the focus lens group 22 based on a command from the camera main body 100. At this time, the focus lens controller 42 moves the focus lens group 22 at a prescribed speed.

A lens side focus adjustment speed detection unit 44 is an example of a focus adjustment speed detection unit. The lens side focus adjustment speed detection unit 44 detects a speed at which the focus lens controller 42 moves the focus lens group 22 by driving the focus lens drive unit 24. This speed is a focus adjustment speed by the interchangeable lens 10. As described above, in a case where the focus mode of the camera is set to manual focus, the focus lens controller 42 moves the focus lens group 22 at a speed corresponding to the operation of the focus ring 16. The lens side focus adjustment speed detection unit 44 detects a speed at which the focus lens controller 42 moves the focus lens group 22 according to the operation of the focus ring 16.

The stop controller 46 controls the stop 30 by controlling the he stop drive unit 32 based on an operation of the stop ring 18 or the command from the camera main body 100. In a case where an exposure control mode of the camera is stop priority or manual, the stop controller 46 controls the stop drive unit 32 according to the setting of an operation ring, and sets the stop 30 to the set F number. In a case where the exposure control mode of the camera is shutter speed priority or auto, the stop controller 46 controls the stop drive unit 32 according to the command from the camera main body, and sets the stop to the instructed F number.

The lens side communication controller 48 controls communication with the camera main body 100. In a case where the interchangeable lens 10 has a communication function of a standard corresponding to a communication standard of the camera main body 100 and the interchangeable lens 10 is attached to the camera main body 100, the interchangeable lens and the camera main body are connected to communicate with each other. The communication is performed via contact points provided on the mounts thereof.

<Electric Configuration of Camera Main Body>

As shown in FIG. 4, the camera main body 100 comprises an image sensor 210, a focusing assistance unit 220, an image sensor drive unit 226, an analog signal processing unit 228, an analog-to-digital converter (ADC) 230, a digital signal processing unit 232, a phase difference detection unit 234, a luminance detection unit 236, a memory card interface 238, a memory card 240, the main monitor 104, the sub monitor 106, the electronic viewfinder (EVF) 108, the camera operation unit 110, and a camera microcomputer 250.

<Image Sensor>

The image sensor 210 images a subject via the interchangeable lens 10. The image sensor 210 includes a solid-state imaging element such as a charged coupled device (CCD) or a complementary metal oxide semiconductor (CMOS). In the digital camera 1 according to the present embodiment, the image sensor 210 having a phase difference detection function is used.

Figure 6:
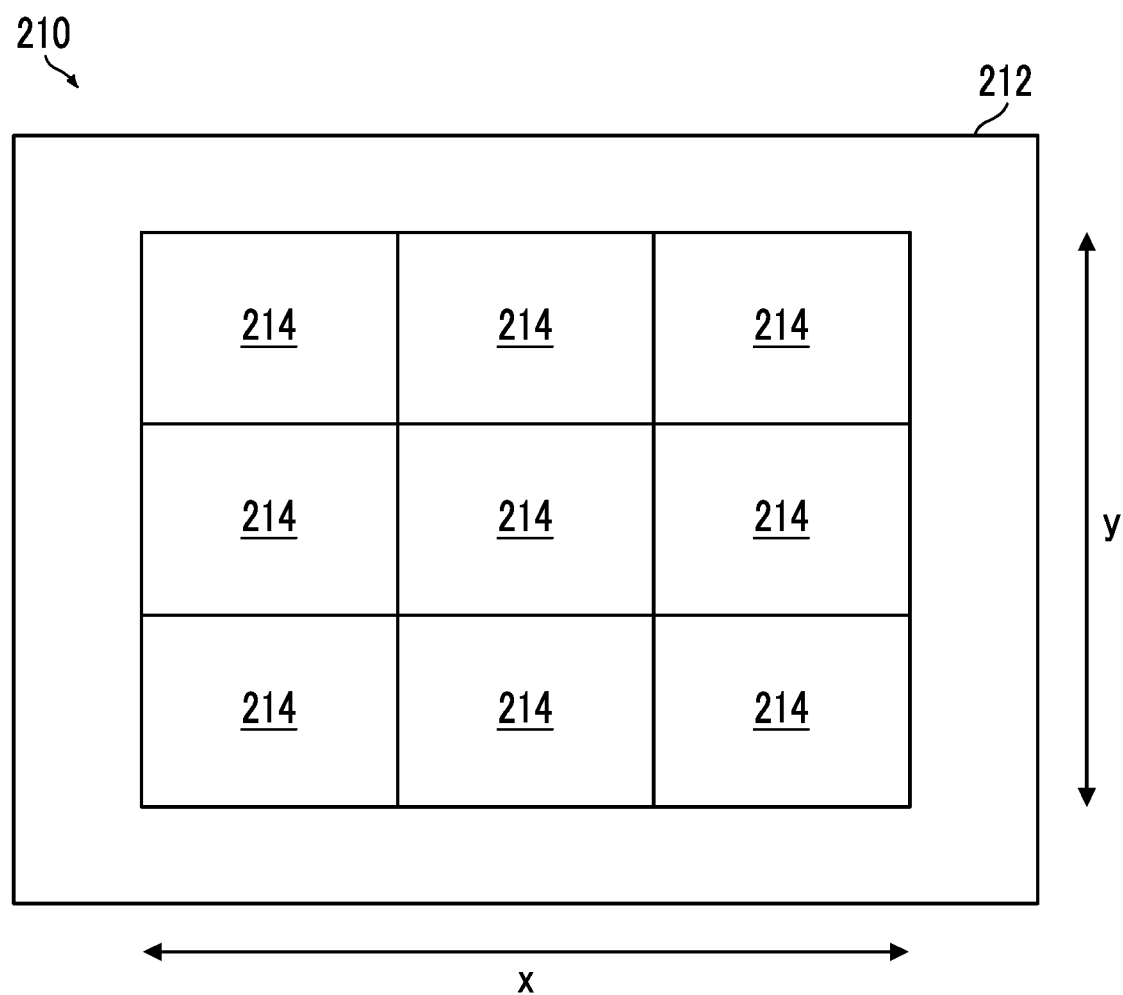
FIG. 6 is a diagram showing a schematic configuration of an image sensor.

FIG. 6 is a diagram showing a schematic configuration of the image sensor.

The image sensor 210 has an imaging surface 212 on which a plurality of pixels is two-dimensionally arranged in an x direction and a y direction. A plurality of AF areas 214 is set on the imaging surface 212. The AF area 214 is an area for detecting a phase difference, and is an area where focusing can be performed based on the detection result. In FIG. 6, an example in which nine AF areas 214 are set at a central portion of a screen.

Figure 7:
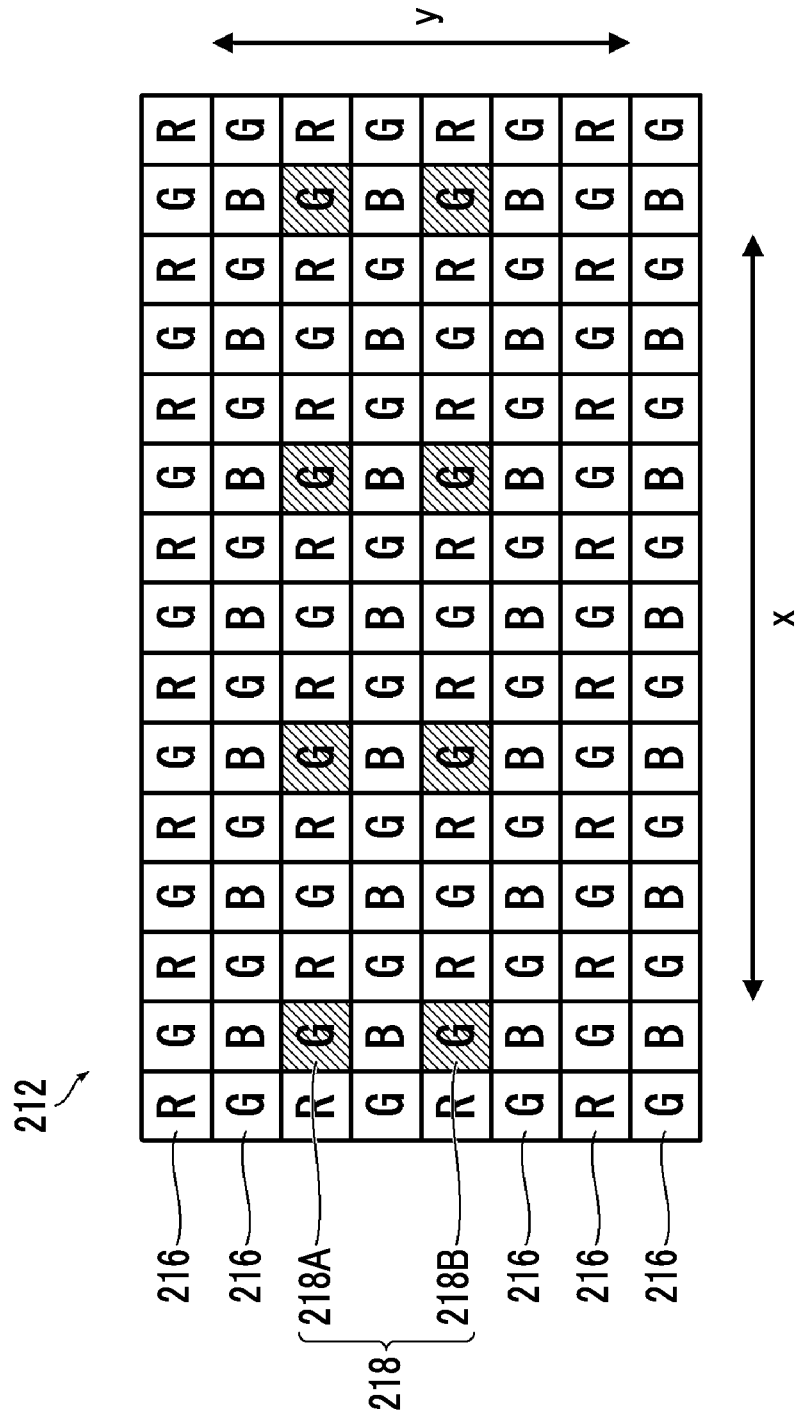
FIG. 7 is an enlarged view of a part of an imaging surface.

FIG. 7 is an enlarged view of a part of the imaging surface.

As described above, the plurality of pixels is two-dimensionally arranged in the x direction and the y direction on the imaging surface 212. Each pixel comprises a photoelectric conversion unit and outputs a signal corresponding to the amount of received light. Each pixel has a color filter of any color of red (R), green (G), and blue (B). The color filters are assigned to the pixels so as to have a predetermined arrangement. FIG. 7 shows an example of a Bayer array. In this diagram, a letter R is given to a pixel (R pixel) having the color filter of R, a letter G is given to a pixel (G pixel) having the color filter of G, and a letter B is given to a pixel (B pixel) having the color filter of B.

In addition to normal pixels 216, phase difference detection pixels 218 are arranged in the AF area. The normal pixel 216 is a normal imaging pixel. The phase difference detection pixel 218 is a pixel that detects a phase difference. The pixels other than the phase difference detection pixels are the normal pixels. Only the normal pixels are arranged in areas other than the AF areas. In FIG. 7, the phase difference detection pixels 218 are indicated by diagonal lines. As shown in this diagram, the phase difference detection pixels 218 are regularly arranged on the imaging surface 212.

The phase difference detection pixels 218 include first phase difference detection pixels 218A and second phase difference detection pixels 218B. The first phase difference detection pixels 218A and the second phase difference detection pixels 218B are arranged close to each other. In the example shown in FIG. 7, the first phase difference detection pixels 218A are arranged at regular intervals in one of two rows of the same array adjacent to each other, and the second phase difference detection pixels 218B are arranged at regular intervals on the other row. In particular, an example in which specific G pixels in a specific row in which the R pixels and the G pixels are arranged are used as the phase difference detection pixels is shown.

Figure 8:
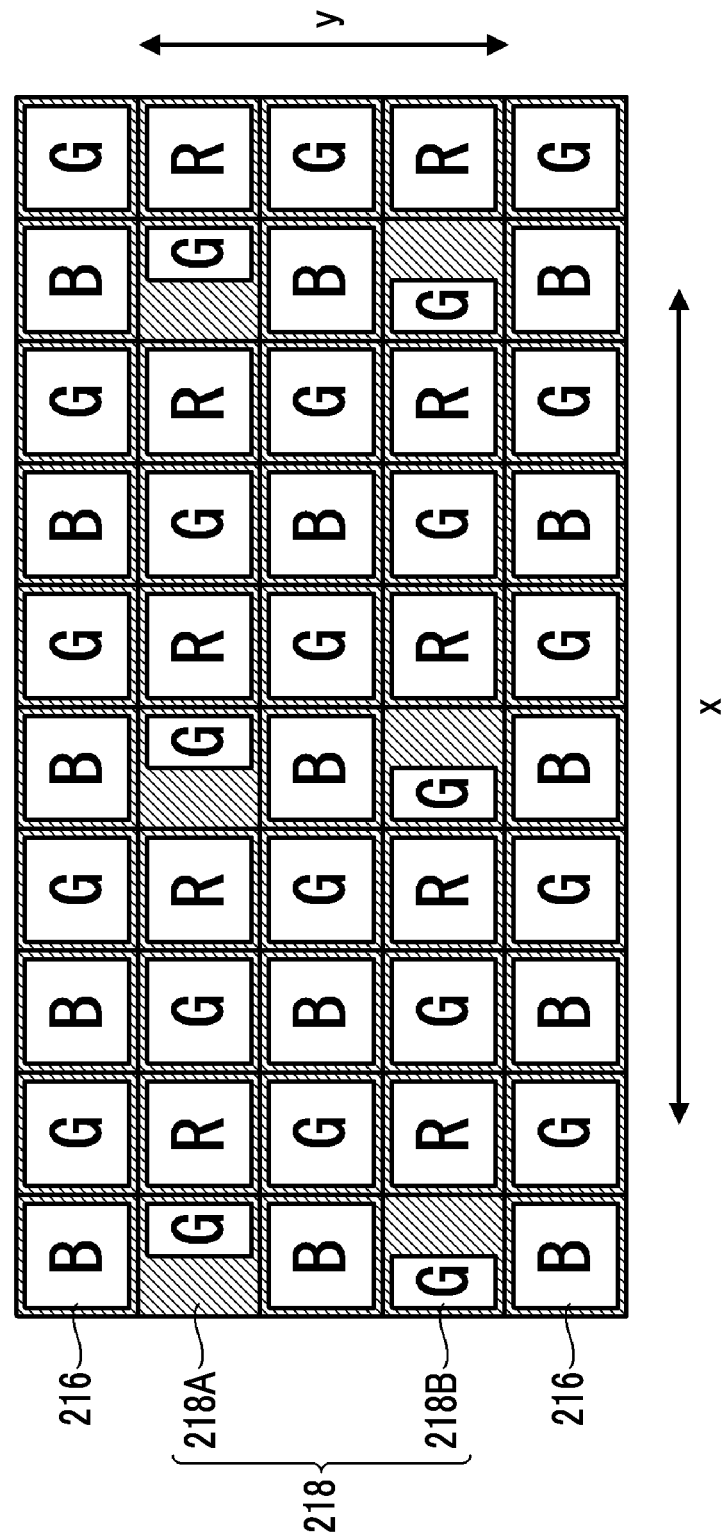
FIG. 8 is a diagram showing a schematic configuration of each pixel.

FIG. 8 is a diagram showing a schematic configuration of each pixel.

Each pixel has a light shielding film comprising a predetermined opening portion. In FIG. 8, the light shielding film is represented by a diagonal line, and the opening portion of the light shielding film is represented in white.

The normal pixel 216 has a light shielding film of which an opening portion coincides with a center of the photoelectric conversion unit. The normal pixel 216 receives light rays passed through almost the entire pupil region of the interchangeable lens 10.

The first phase difference detection pixel 218A has a light shielding film of which an opening portion is eccentric to a right side with respect to the center of the photoelectric conversion unit. As a result, the first phase difference detection pixel 218A receives one of a pair of light rays passed through different portions of the pupil region of the interchangeable lens 10.

The second phase difference detection pixel 218B has a light shielding film of which an opening portion is eccentric to a left side with respect to the center of the photoelectric conversion unit. As a result, the second phase difference detection pixel 218B receives the other of the pair of light rays passed through the different portions of the pupil region of the interchangeable lens 10.

With the aforementioned configuration, it is possible to detect a phase difference in each AF area by acquiring signals of the first phase difference detection pixel 218A and the second phase difference detection pixel 218B and comparing these pixels.

<Focusing Assistance Unit>

The focusing assistance unit 220 assists the focusing by moving the image sensor 210 back and forth along the optical axis L. The focusing assistance unit 220 comprises an image sensor movement drive unit 222 that moves the image sensor 210 along the optical axis along L, and an image sensor position detection unit 224 that detects a position of the image sensor 210.

The image sensor movement drive unit 222 comprises, for example, an actuator such as a piezo actuator, and a drive circuit thereof. The image sensor 210 moves within a movable range with a reference position as a reference. The reference position is set at a center of the movable range, and is set at a position of a flange back. In general, the interchangeable lens 10 is optically designed by using the flange back position as a reference. Therefore, the optical performance of the interchangeable lens 10 can be maximized by positioning the image sensor 210 at the reference position.

The image sensor position detection unit 224 detects the position of the image sensor 210 relative to the reference position. The image sensor position detection unit 224 includes, for example, a displacement sensor such as an eddy current sensor.

<Image Sensor Drive Unit>

The image sensor drive unit 226 drives the image sensor 210 under the control of the camera microcomputer 250. The image sensor 210 is driven by the image sensor drive unit 226 to image an image.

<Analog Signal Processing Unit>

The analog signal processing unit 228 acquires an analog image signal for each pixel output from the image sensor 210, and performs predetermined signal processing (for example, sampling two correlation pile and amplification processing).

<ADC>

The ADC 230 converts the analog image signals output from the analog signal processing unit 228 into digital image signals, and outputs the digital image signals.

<Digital Signal Processing Unit>

The digital signal processing unit 232 acquires the digital image signals, and generates image data by performing predetermined signal processing (for example, gradation transformation processing, white balance correction processing, gamma-correction processing, demosaicing processing, and YC conversion processing).

<Phase Difference Detection Unit>

The phase difference detection unit 234 detects the phase difference of the designated AF area 214. The phase difference detection unit 234 acquires the signals of the first phase difference detection pixels 218A and the second phase difference detection pixels 218B from the designated AF area 214, and calculates the phase difference by performing predetermined correlation calculation processing on the acquired signals. The AF area 214 is selected manually or automatically. In the case of the manual selection, any arbitrary AF area 214 is selected by operating the focus lever 121. In the case of the automatic selection, the AF area is selected by performing processing for detecting a main subject (for example, face detection).

<Luminance Detection Unit>

The luminance detection unit 236 detects the luminance of the subject required for exposure control based on an output from the normal pixel of the image sensor 210.

<Memory Card Interface and Memory Card>

The memory card interface 238 reads and writes data from and to the memory card 240 attached to a card slot under the control of the camera microcomputer 250.

<Main Monitor>

The main monitor 104 includes an LCD. The display on the main monitor 104 is controlled by the camera microcomputer 250. The camera microcomputer 250 controls the display on the main monitor 104 via an LCD driver 104a.

<Sub Monitor>

The sub monitor 106 includes an LCD. The display on the sub monitor 106 is controlled by the camera microcomputer 250. The camera microcomputer 250 controls the display on the sub monitor 106 via an LCD driver 106a.

<Electronic Viewfinder>

The display unit of the electronic viewfinder (EVF) 108 is an LCD. The display on the electronic viewfinder 108 is controlled by the camera microcomputer 250. The camera microcomputer 250 controls the display on the electronic viewfinder 108 via an LCD driver 108a.

<Camera Operation Unit>

The camera operation unit 110 outputs a signal corresponding to the operation of each operation member to the camera microcomputer 250.

<Camera Microcomputer>

The camera microcomputer 250 is a microcomputer comprising a CPU, a ROM, and a RAM, and functions as a controller that performs various controls of the camera by executing a predetermined program (for example, a focusing assistance program).

Figure 9:
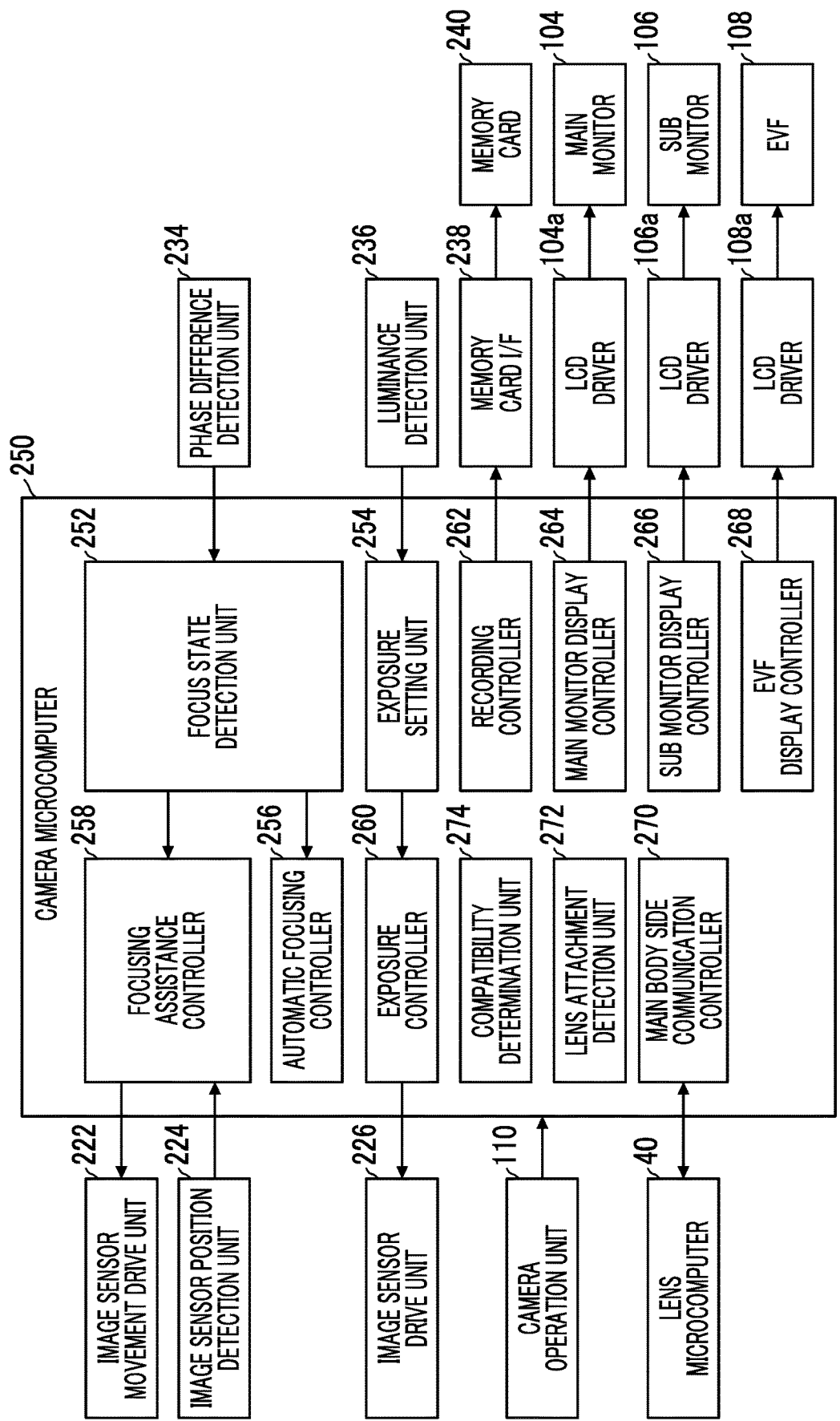
FIG. 9 is a block diagram of main functions realized by a camera microcomputer.

FIG. 9 is a block diagram of main functions realized by the camera microcomputer.

The camera microcomputer 250 functions as a focus state detection unit 252, an exposure setting unit 254, an automatic focusing controller 256, a focusing assistance controller 258, an exposure controller 260, a recording controller 262, a main monitor display controller 264, a sub monitor display controller 266, an EVF display controller 268, a main body side communication controller 270, a lens attachment detection unit 272, and a compatibility determination unit 274 by executing a predetermined control program.

[Focus State Detection Unit]

The focus state detection unit 252 detects a focus state of the designated AF area 214. The focus state detection unit 252 detects a direction and amount of defocus as the focus state. The focus state detection unit 252 calculates the direction and amount of defocus based on information on the phase difference information calculated by the phase difference detection unit 234.

[Exposure Setting Unit]

The exposure setting unit 254 sets an exposure (F number and shutter speed) based on information on the luminance of the subject detected by the luminance detection unit 236.

[Automatic Focusing Controller]

In a case where the focus mode of the camera is set to auto focus, the automatic focusing controller 256 controls the driving of the focus lens group 22 such that the main subject is automatically focused. The automatic focusing controller 256 focuses on the main subject by controlling the driving of the focus lens group 22 based on the detection result of the focus state detection unit 252. The automatic focusing controller 256 outputs a drive command of the focus lens group 22 to the lens microcomputer 40, and controls the driving of the focus lens group 22.

The automatic focusing can be performed only in a case where the interchangeable lens can be controlled on the camera main body side. In a case where the interchangeable lens 10 cannot communicate with the camera main body 100 or the drive unit of the focus lens group 22 is not provided, the interchangeable lens cannot use an automatic focusing function.

[Focusing Assistance Controller]

In a case where the focus mode of the camera is set to manual focus and the focusing assistance function is turned on, the focusing assistance controller 258 assists the focusing by controlling the focusing assistance unit 220 based on the detection result of the focus state detection unit 252. That is, the focusing is manually assisted by the user by moving the image sensor 210. At this time, the moving speed of the image sensor 210 is controlled such that the user who is viewing the electronic viewfinder (EVF) 108 or the live view does not feel uncomfortable. This control will be described in detail below.

[Exposure Controller]

The exposure controller 260 controls an exposure according to the exposure set by the exposure setting unit 254. That is, the driving of the stop 30 is controlled such that the F number reaches the set value, and the driving of the image sensor 210 is controlled such that the exposure is performed at the set shutter speed (exposure time). A drive command is output to the lens microcomputer 40, and the stop 30 is set to the set F number.

The stop 30 can be controlled only in a case where the interchangeable lens 10 can communicate with the camera main body 100. In a case where the interchangeable lens 10 cannot communicate with the camera main body 100, the F number set on the lens side is manually input to the camera main body 100.

[Recording Controller]

The recording controller 262 controls recording of image data obtained by imaging. The recording controller 262 generates an image file in a predetermined format from the image data obtained by imaging, and records the image file in the memory card 240.

[Main Monitor Display Controller]

The main monitor display controller 264 controls the display on the main monitor 104. For example, an image captured by the image sensor 210 is displayed on the main monitor 104 in real time according to a live view display instruction. The menu screen is displayed on the main monitor 104 according to a display instruction of the menu screen.

[Sub Monitor Display Controller]

The sub monitor display controller 266 controls the display on the sub monitor 106. The sub monitor display controller 266 acquires information to be displayed on the sub monitor 106, and displays the acquired information on the sub monitor 106 in a predetermined format.

[EVF Display Controller]

The EVF display controller 268 controls the display of the electronic viewfinder (EVF) 108. In a case where the use of the EVF 108 is selected, the EVF display controller 268 displays the image captured by the image sensor 210 on the electronic viewfinder (EVF) 108 in real time.

[Main Body Side Communication Controller]

The main body side communication controller 270 controls communication with the interchangeable lens 10. In a case where the interchangeable lens 10 has a communication function of a standard corresponding to a communication standard of the camera main body 100 and the interchangeable lens 10 is attached to the camera main body 100, the interchangeable lens and the camera main body are connected to communicate with each other. The communication is performed via contact points provided on the mounts thereof.

[Lens Attachment Detection Unit]

The lens attachment detection unit 272 detects attachment of the interchangeable lens 10. The detection is performed, for example, by detecting energization to a detection contact point provided on the main body side mount 102.

[Compatibility Determination Unit]

The compatibility determination unit 274 determines whether or not the interchangeable lens 10 attached to the camera main body 100 has compatibility. That is, it is determined whether or not the attached interchangeable lens 10 is a lens controllable by the camera main body 100. The compatibility determination unit 274 determines whether or not the attached interchangeable lens 10 has the compatibility based on whether or not the communication with the interchangeable lens 10 can be performed and lens information acquired from the interchangeable lens.

[Operation of Digital Camera]

<<Determination of Compatibility>>

In a case where the power is turned on, the digital camera 1 determines whether or not the interchangeable lens 10 is attached. In a case where it is determined that the interchangeable lens 10 is attached, it is further determined whether or not the interchangeable lens has the compatibility.

In a case where an interchangeable lens having no compatibility is attached to the camera main body 100, the interchangeable lens cannot be controlled from the camera main body side. Accordingly, in this case, a function related to lens control is limited. That is, the focus adjustment and the setting of the stop are manually set.

<Still Image Imaging>

In the digital camera 1, imaging preparation is performed by pushing the shutter button 114 halfway, and image recording is performed by fully pushing the shutter button. In a case where the focus mode of the camera is set to auto focus, the auto focus is operated by pushing the shutter button 114 halfway. In a case where the focus mode of the camera is set to manual focus, the focusing of the interchangeable lens 10 is manually performed.

<Motion Picture Imaging>

The digital camera 1 starts the imaging by fully pushing the shutter button 114 for the first time, and ends the imaging by fully pushing the shutter button 114 for the second time. In a case where the focus mode of the camera is set to auto focus, the auto focus operates simultaneously with the start of the imaging. In a case where the focus mode of the camera is set to manual focus, the focusing of the interchangeable lens 10 is manually performed.

[Focusing Assistance]

As described above, the digital camera 1 according to the present embodiment has a function of assisting a manual focusing operation. This function is provided in the form of assisting final focusing on the camera side. Thus, the operation is performed in a case where it is recognized that the focusing assistance unit approaches the in-focus state. This focusing assistance is performed by moving the image sensor 210 along the optical axis L. The focusing assistance controller 258 brings the focusing assistance unit into the in-focus state by controlling the movement of the image sensor 210 based on the detection result of the focus state detection unit 252. Hereinafter, the focusing assistance performed by the digital camera 1 according to the present embodiment will be described in detail.

As described above, the focusing assistance function is operated in a case where it is recognized that the focusing assistance unit approaches the in-focus state. The digital camera 1 according to the present embodiment operates in a case where a manual focus adjustment speed is reduced to a threshold value or less. Generally, in the case of manual focusing, an operation speed is reduced near the focus.

Figure 10:
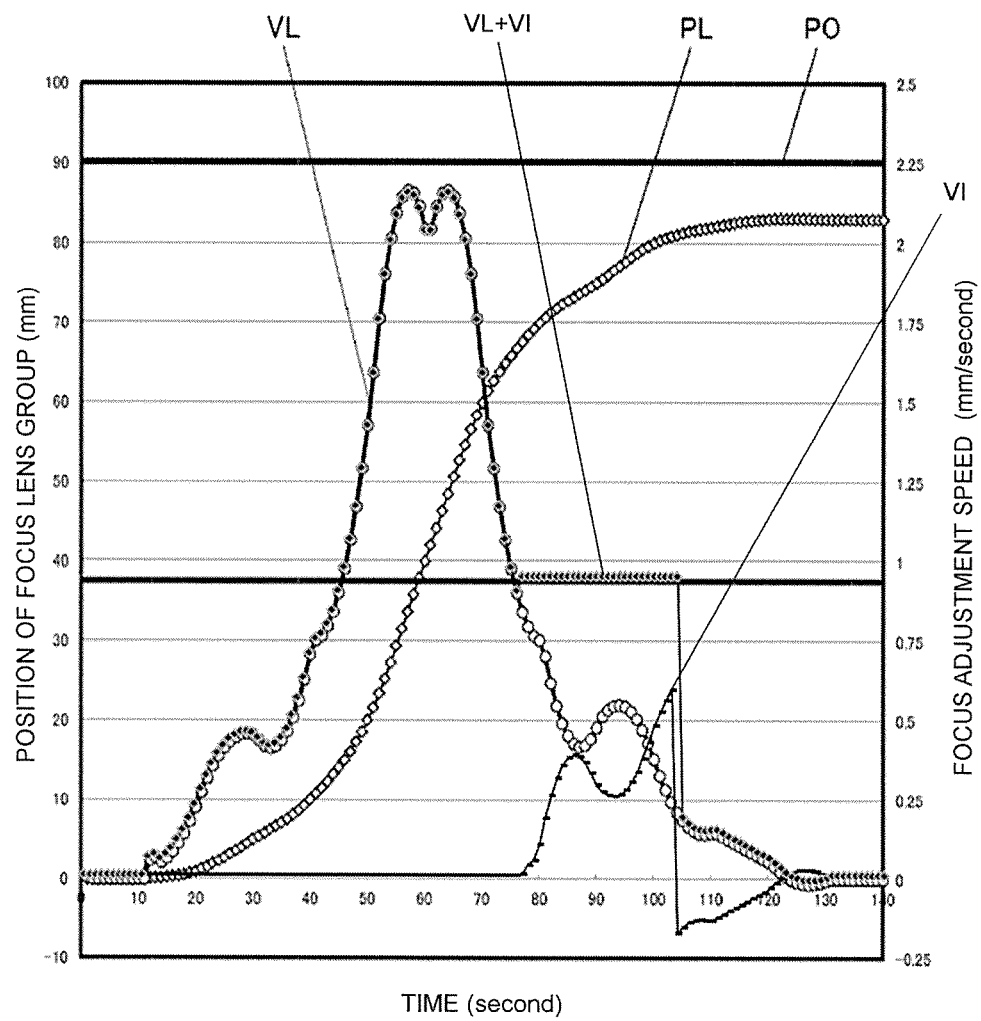
FIG. 10 is a graph showing a change in a manual focus adjustment speed, a change in a position of a focus lens group, and a control in a movement of the image sensor.

FIG. 10 is a graph showing a change in the manual focus adjustment speed, a change in the position of the focus lens group, and a control in the movement of the image sensor. In this graph, a reference VL is a graph showing the change in the manual focus adjustment speed, and a reference PL is a graph showing the change in the position of the focus lens group. A reference PO is a position of the focus lens group that focuses on the subject, that is, a target position of the focus lens group. A reference VI is a graph showing a focus adjustment speed by the movement of the image sensor 210, and a reference VL+VI is a graph showing a sum of the manual focus adjustment speed (the focus adjustment speed by the movement of the focus lens group 22) and the focus adjustment speed by the movement of the image sensor 210.

As shown in this graph, in the case of manual focusing, the focus lens group 22 is moved at a high speed before focusing, and the speed is reduced by focusing. Thus, in a case where it is detected that the manual focus adjustment speed is reduced to a predetermined speed, it is possible to detect that the focusing assistance unit approaches the in-focus state. Accordingly, in the digital camera 1 according to the present embodiment, in a case where the manual focus adjustment speed is reduced to a threshold value Vth or less, it is determined that the focusing assistance unit approaches the in-focus state, and focusing assistance is started.

The manual focus adjustment speed is detected as a moving speed of the focus lens group 22. The moving speed of the focus lens group 22 is detected by the lens side focus adjustment speed detection unit 44 of the interchangeable lens 10. The focusing assistance controller 258 acquires information on the moving speed of the focus lens group 22 via the lens microcomputer 40.

In a case where the manual focus adjustment speed is reduced to the threshold value or less, the focusing assistance controller 258 brings the focusing assistance unit into the in-focus state by controlling the movement of the image sensor 210 based on the detection result of the focus state detection unit 252. At this time, the focusing assistance controller brings the focusing assistance unit into the in-focus state by controlling the movement of the image sensor 210 such that the sum of the manual focus adjustment speed and the focus adjustment speed due to the movement of the image sensor 210 is set to a speed equal to or less than the threshold value based on the detection result of the focus state detection unit 252. Accordingly, it is possible to naturally bring the focusing assistance unit into the in-focus state without giving the user who performs manual focusing uncomfortable feeling. That is, it is possible to bring the focusing assistance unit into the in-focus state without being aware of the assistance of the camera. Since the focusing is assisted by the movement of the image sensor 210, the focusing can be appropriately assisted even in a case where an old lens is used. It is possible to prevent so-called overfocus by moving the image sensor 210 according to the driving of the focus of the user.

Figure 11:
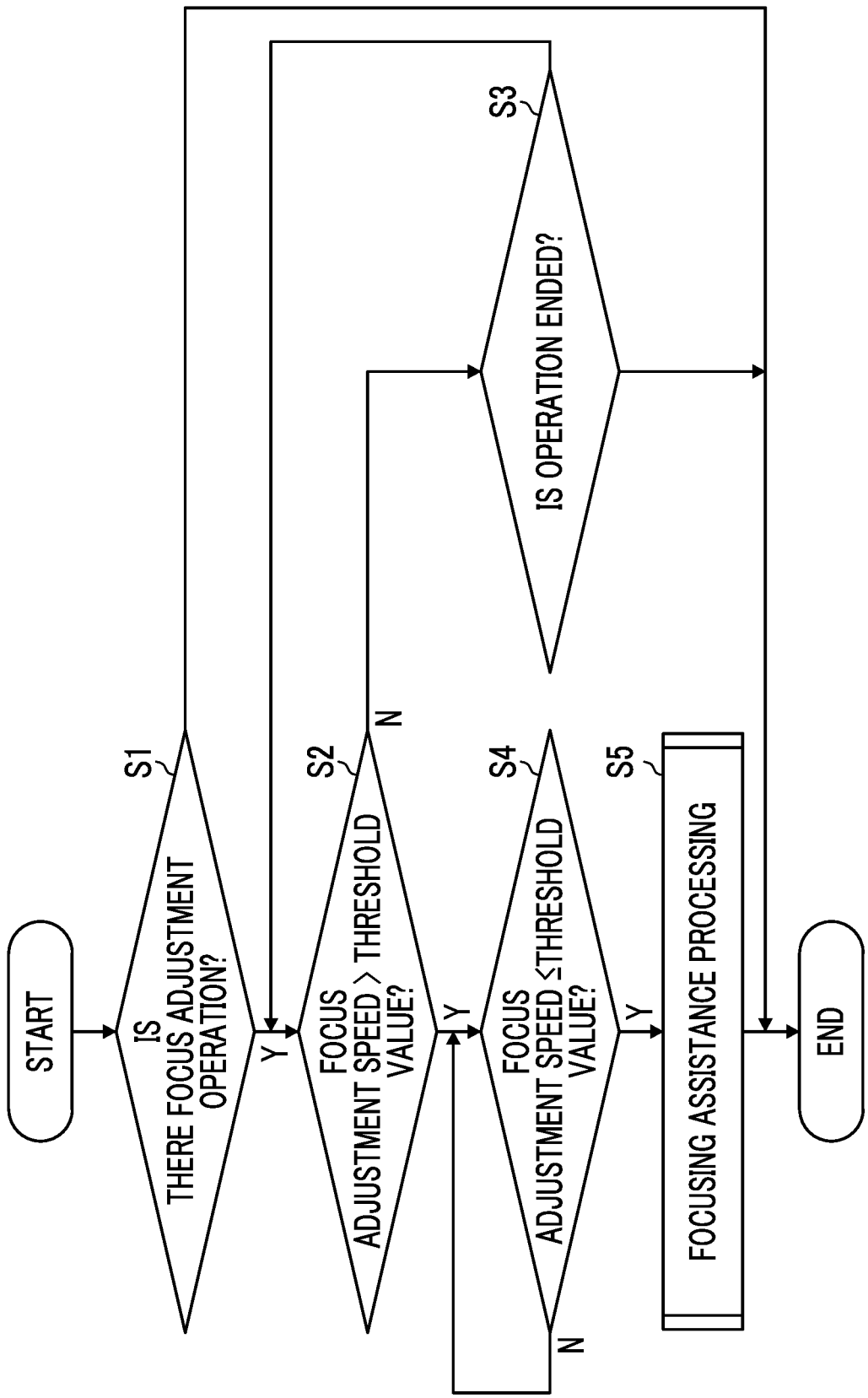
FIG. 11 is a flowchart showing a procedure for assisting focusing by a focusing assistance controller.

FIG. 11 is a flowchart showing a procedure (focusing assistance method) for assisting focusing by the focusing assistance controller.

The focusing assistance function operates in a case where the focus mode of the camera is set to manual focus and the focusing assistance function is turned on. Thus, the following processing is performed on the assumption that the focus mode of the camera is set to manual focus and the focusing assistance function is turned on.

First, it is determined whether or not a manual focus adjustment operation is performed (step S1). That is, it is determined whether or not the focus ring 16 is operated.

In a case where the focus ring 16 is operated and the manual focus adjustment is performed, it is determined whether or not the focus adjustment speed exceeds the threshold value (step S2). As described above, the manual focus adjustment speed is detected as the moving speed of the focus lens group 22. The focusing assistance controller 258 acquires the information on the moving speed of the focus lens group 22 detected by the lens side focus adjustment speed detection unit 44. It is determined whether or not the acquired speed exceeds the threshold value Vth by comparing the acquired speed with the threshold value Vth.

In a case where it is determined that the manual focus adjustment speed (the moving speed of the focus lens group 22) does not exceed the threshold value Vth, the focusing assistance controller 258 determines whether or not the manual focus adjustment operation is ended (step S3). That is, it is determined whether or not the operation of the focus ring 16 is stopped. In a case where the manual focus adjustment operation is ended, the assistance processing is also ended.

Meanwhile, in a case where it is determined that the manual focus adjustment speed exceeds the threshold value, the focusing assistance controller 258 determines whether or not the manual focus adjustment speed is reduced to the threshold value or less (step S4).

In a case where it is determined that the manual focus adjustment speed is reduced to the threshold value or less, the focusing assistance processing is executed (step S5).

Figure 12:
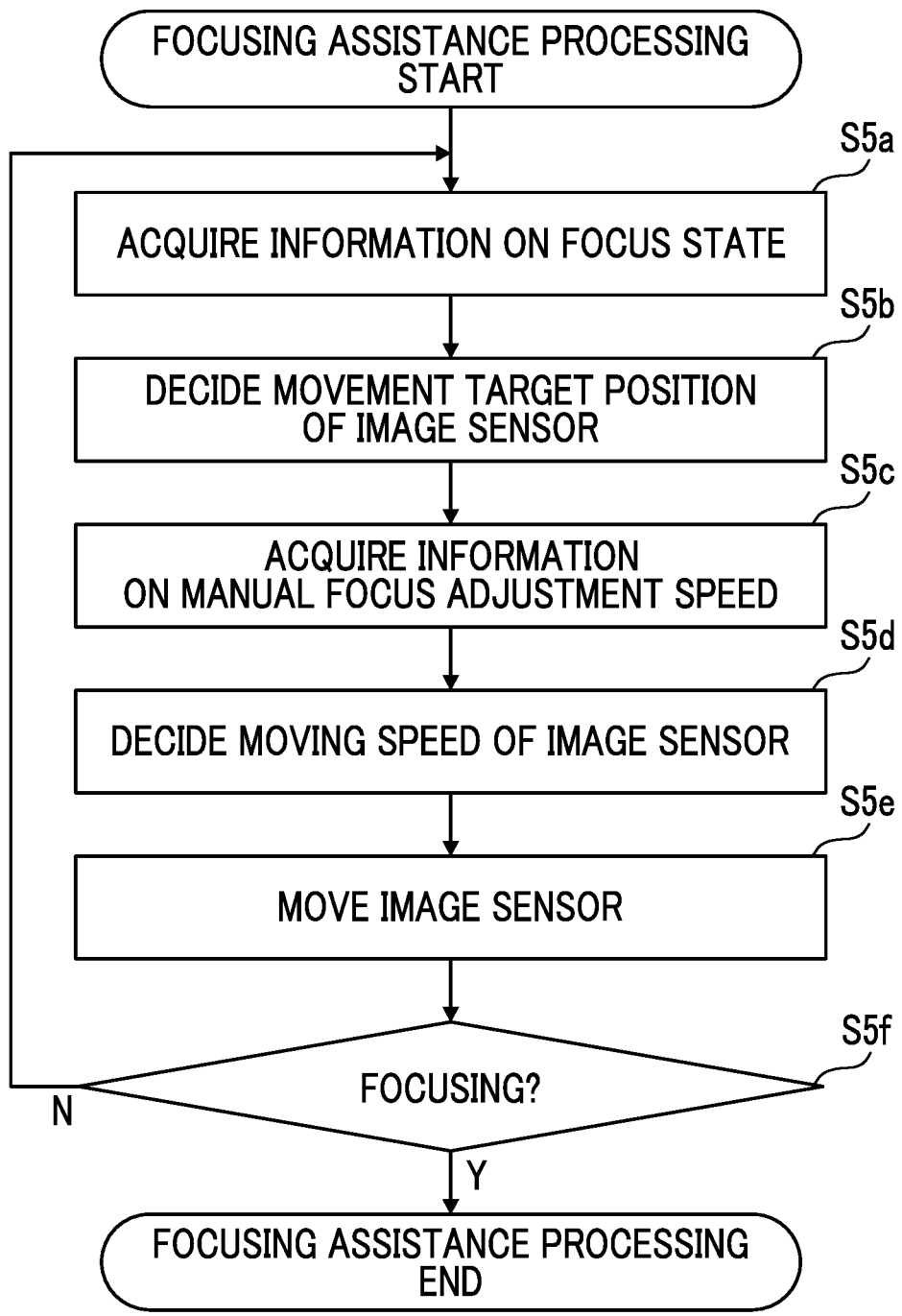
FIG. 12 is a flowchart showing a procedure of focusing assistance processing.

FIG. 12 is a flowchart showing a procedure of the focusing assistance processing.

First, the focus state is detected, and information on the detection result is acquired (step S5a). That is, information on the direction and amount of defocus is acquired.

Subsequently, a movement target position of the image sensor 210 is decided based on information on the acquired focus state (step S5b). That is, a moving destination of the image sensor 210 for focusing on the subject is decided.

Subsequently, the information on the manual focus adjustment speed is acquired (step S5c). That is, the information on the moving speed of the focus lens group 22 being manually operated is acquired.

Subsequently, the moving speed of the image sensor 210 is decided based on the acquired information on the manual focus adjustment speed (step S5d). This speed is set to a speed equal to or less than the threshold value in a case where this speed is added to the manual focus adjustment speed. That is, in a case where the manual focus adjustment speed is VL and the moving speed of the image sensor 210 is VI, the moving speed of the image sensor 210 is set so as to satisfy a condition of (VL+VI)≤Vth. The moving speed of the image sensor 210 is synonymous with the focus adjustment speed by moving the image sensor 210. Thus, in this case, the sum of the manual focus adjustment speed (the focus adjustment speed by the movement of the focus lens group 22) and the focus adjustment speed by the movement of the image sensor 210 is set to a speed equal to or less than the threshold value.

Subsequently, the image sensor 210 is moved according to the set condition (step S5e). That is, the image sensor 210 is moved to the set movement target position at the set movement speed.

After the movement of the image sensor 210, it is determined whether or not the focusing is performed based on the detection result of the focus state detection unit 252 (step S5f).

In a case where the focusing is not performed, the processing returns to step S5a, and the focusing processing is performed again. In a case where the focusing is performed, the processing ends.

As described above, in the digital camera 1 according to the present embodiment, the focusing assistance unit is brought into the in-focus state by controlling the moving speed of the image sensor 210 so as not to exceed the focus adjustment speed in the case of starting the assistance in a case where the manual focusing is assisted. Accordingly, the focusing assistance unit can be naturally brought into the in-focus state without giving the user uncomfortable feeling. Accordingly, it is possible to assist the focusing without the user being aware of the operation.

MODIFICATION EXAMPLES

Modification Example of Speed Control of Focus Adjustment in Case of Bringing Focusing Assistance Unit to in-Focus State As described above, in a case where the focusing assistance unit is brought into the in-focus state, the movement of the image sensor 210 is controlled such that the sum of the manual focus adjustment speed (the focus adjustment speed by the movement of the focus lens group 22) and the focus adjustment speed by the movement of the image sensor 210 is set to a speed equal to or less than the threshold value. That is, the focusing assistance unit is brought into the in-focus state by controlling the movement of the image sensor 210 so as not to exceed the manual focus adjustment speed in the case of starting the assistance. At this time, as a control aspect of the total focus speed, the movement of the image sensor 210 may be controlled such that the speed is maintained at a constant speed. That is, the movement of the image sensor 210 may be controlled such that the sum of the manual focus adjustment speed and the focus adjustment speed by the movement of the image sensor 210 is maintained at a predetermined speed. For example, the movement of the image sensor 210 may be controlled such that the sum of the manual focus adjustment speed and the focus adjustment speed by the movement of the image sensor 210 is maintained at a speed of the threshold value.

The movement of the image sensor 210 may be controlled such that the total speed is gradually decreased. That is, the movement of the image sensor 210 is controlled such that the sum of the manual focus adjustment speed and the focus adjustment speed by the movement of the image sensor 210 is gradually reduced after the manual focus adjustment speed is reduced to the threshold value. In this case, after the assistance is started, a total focus adjustment speed is gradually decreased such that the focusing is performed for a predetermined time. For example, the total focusing speed is monotonically reduced.

Modification Example 1 of Conditions for Starting Assistance

In the aforementioned embodiment, the focusing assistance processing is started in a case where the manual focus adjustment speed is reduced to the threshold value or less. However, the manual focusing is difficult to be constant. Thus, the assistance focusing processing is started in a case where an average value of the manual focus adjustment speed is obtained and the average value is reduced to the threshold value or less. Accordingly, it is possible to perform more stable control.

Figure 13:
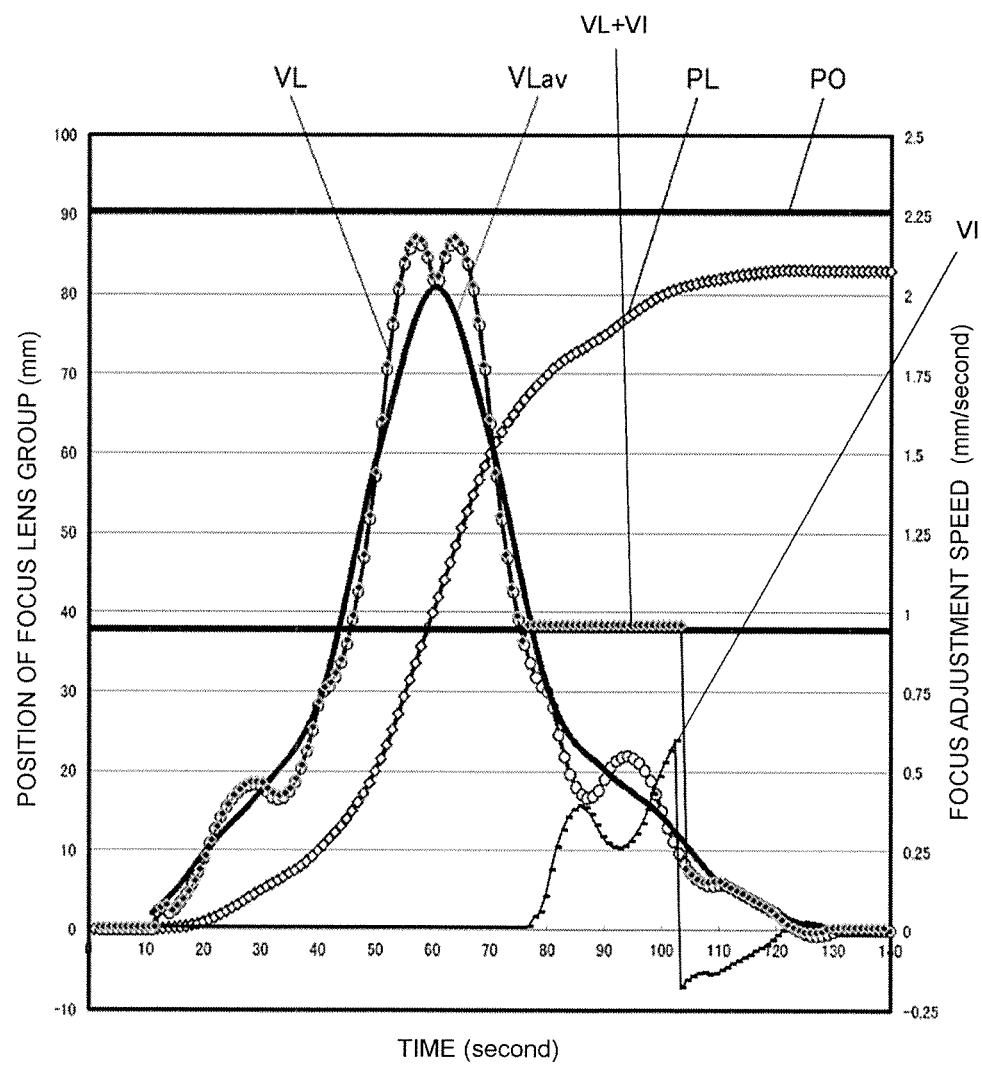
FIG. 13 is a graph showing a change in the manual focus adjustment speed, a change in the position of the focus lens group, and a control in the movement of the image sensor.

FIG. 13 is a graph showing a change in the manual focus adjustment speed, a change in the position of the focus lens group, and a control in the movement of the image sensor. In this graph, a reference VL is a graph showing the change in the manual focus adjustment speed, and a reference VLav is a graph showing the change in the average value of the manual focus adjustment speed. A reference PL is a graph showing the change in the position of the focus lens group, and a reference PO is the position of the focus lens group that focuses on the subject. A reference VI is a graph showing a focus adjustment speed by the movement of the image sensor 210, and a reference VL+VI is a graph showing a sum of the manual focus adjustment speed (the focus adjustment speed by the movement of the focus lens group 22) and the focus adjustment speed by the movement of the image sensor 210.

As shown in this graph, the influence of the manual speed fluctuation is eliminated by using the average value of the manual focus adjustment speed, and stable control can be performed.

Modification Example 2 of Condition for Starting Assistance

In the aforementioned embodiment, the focusing assistance processing is started in a case where the manual focus adjustment speed is reduced to the threshold value or less. However, in a case where the manual focusing is performed, the user may not be able to adjust the focus at a predetermined speed. Thus, in a case where the manual focus adjustment speed is reduced to the threshold value or less and a defocus amount detected by the focus state detection unit 252 becomes equal to or less than a prescribed value, the assistance is started. Accordingly, the assistance can be started more appropriately.

Figure 14:
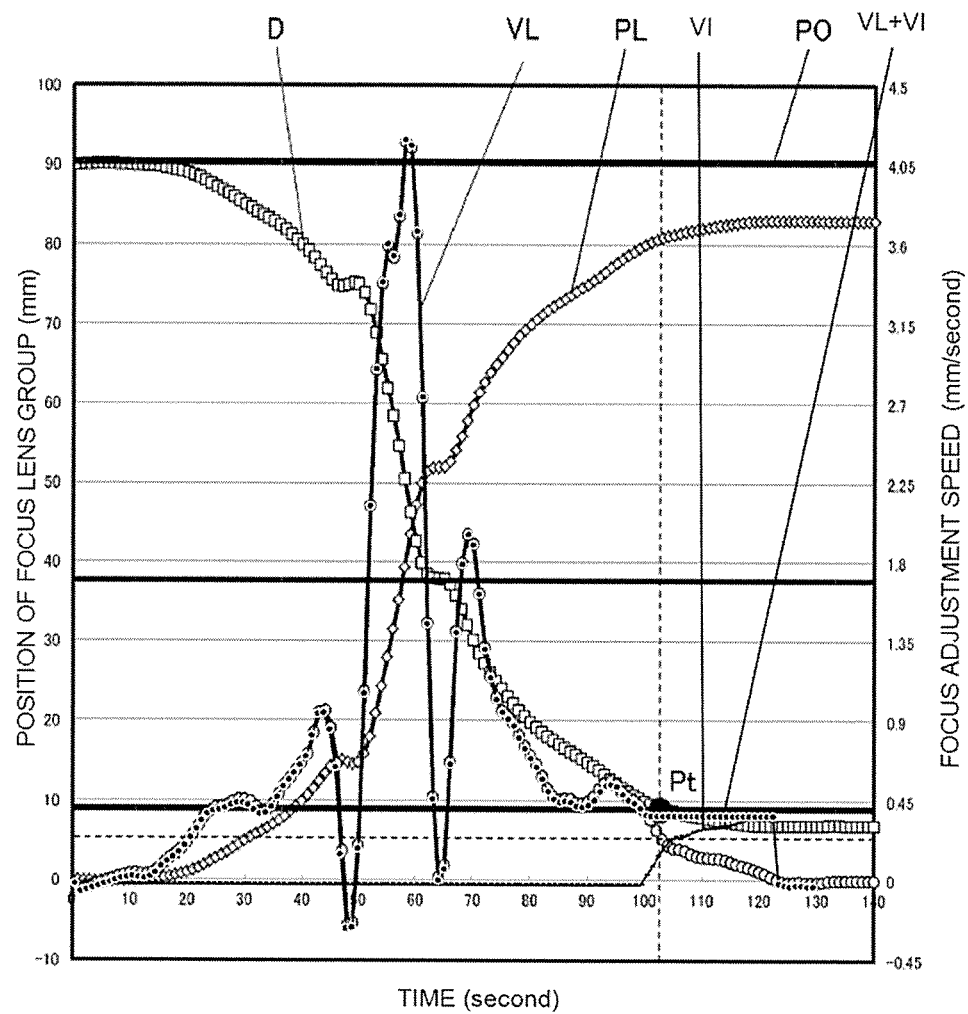
FIG. 14 is a graph showing a change in the manual focus adjustment speed, a change in the position of the focus lens group, a control in a movement of the image sensor, and a change in the defocus amount.

FIG. 14 is a graph showing a change in the manual focus adjustment speed, a change in the position of the focus lens group, a control in the movement of the image sensor, and a change in the defocus amount. In this graph, a reference VL is a graph showing the change in the manual focus adjustment speed. A reference PL is a graph showing the change in the position of the focus lens group. A reference PO is the position of the focus lens group that focuses on the subject. A reference VI is a graph showing a focus adjustment speed by the movement of the image sensor 210, and a reference VL+VI is a graph showing a sum of the manual focus adjustment speed (the focus adjustment speed by the movement of the focus lens group 22) and the focus adjustment speed by the movement of the image sensor 210. A reference D is a graph showing the change in the defocus amount. The defocus amount shows the same change as a difference between the position (target position) of the focus lens group 22 that focuses on the subject and the current position of the focus lens group 22.

In FIG. 14, a reference Vth is a threshold value of the manual focus adjustment speed, and a reference Dth is a prescribed value of the defocus amount. In the case of the present example, in a case where the manual focus adjustment speed is reduced to the threshold value Vth or less and the defocus amount detected by the focus state detection unit 252 becomes equal to or less than the prescribed value Dth, the assistance is started. Thus, even though the manual focus adjustment speed becomes equal to or less than the threshold value Vth, in a case where the defocus amount exceeds the prescribed value Dth, the assistance is not operated. Similarly, even in a case where the defocus amount detected by the focus state detection unit 252 becomes equal to or less than the prescribed value Dth, in a case where the manual focus adjustment speed exceeds the threshold value Vth, the assistance is not operated. Only in a case where both conditions are not satisfied, the assistance is initially started.

In the example shown in FIG. 14, a point Pt is a point at which the manual focus adjustment speed is equal to or less than the threshold value Vth and the defocus amount detected by the focus state detection unit 252 is equal to or less than the prescribed value Dth.

As described above, the assistance can be more appropriately started by starting the assistance in a case where the manual focus adjustment speed is reduced to the threshold value or less and the defocus amount detected by the focus state detection unit 252 becomes equal to or less than the prescribed value. More stable control can be performed.

In the case of the present example, the movement of the image sensor 210 is controlled such that the sum of the manual focus adjustment speed and the focus adjustment speed by the movement of the image sensor 210 is set to a speed equal to or less than the threshold value of the manual focus adjustment speed in the case of the assistance.

However, in a case where the defocus amount becomes equal to or less than the prescribed value after the manual focus adjustment speed becomes equal to or less than the threshold value, it is preferable that the movement of the image sensor 210 is controlled such that this speed is set to a speed equal to or less than a speed at which the defocus amount reaches the prescribed value. Accordingly, the focusing assistance unit can be naturally brought into the in-focus state without giving the user uncomfortable feeling. In the example shown in FIG. 14, the movement of the image sensor 210 is controlled such that the speed is set to a speed equal to or less than the manual focus adjustment speed at the point Pt.

Still Another Modification Example

In the case of the present example, the average value of the manual focus adjustment speed may be obtained, and in a case where the average value is reduced to the threshold value or less and the defocus amount becomes equal to or less than the prescribed value, the assistance may be started.

As a control aspect of the focus adjustment speed in the case of the assistance, the focusing assistance unit may be brought into the in-focus state by maintaining the sum of the manual focus adjustment speed and the focus adjustment speed by the movement of the image sensor 210 at the speed of the threshold value. In a case where the defocus amount becomes equal to or less than the prescribed value after the manual focus adjustment speed becomes equal to or less than the threshold value, the focusing assistance unit is brought into the in-focus state by maintaining the speed at which the defocus amount reaches the prescribed value. In the example shown in FIG. 14, the focusing assistance unit is brought into the in-focus state by maintaining the manual focus adjustment speed at the point Pt.

The focusing assistance unit may be brought into the in-focus state by gradually decreasing the sum of the manual focus adjustment speed and the focus adjustment speed by the movement of the image sensor 210 such that the focusing is performed in a predetermined time. For example, the focusing assistance unit may be brought into the in-focus state by monotonically reducing the speed. In the example shown in FIG. 14, the focusing assistance unit is brought into the in-focus state by gradually decreasing the manual focus adjustment speed at the point Pt.

Second Embodiment

In the first embodiment, the manual focus adjustment speed is detected on the interchangeable lens side, and the information on the detected speed is transmitted to the camera main body side. In the case of the present configuration, in a case where the interchangeable lens having no compatibility is attached, it is not possible to acquire the information on the manual focus speed. Thus, in the digital camera according to the present embodiment, the manual focus adjustment speed is detected on the camera main body side.

[Configuration]

In the digital camera according to the present embodiment, the manual focus adjustment speed is detected based on the change in the focus state. In a case where the focus lens group 22 is moved, the focus state changes according to the movement. In the digital camera 1 according to the present embodiment, the change in the focus state is detected, and the manual focus adjustment speed is detected. This processing is performed by the camera microcomputer 250.

Figure 15:
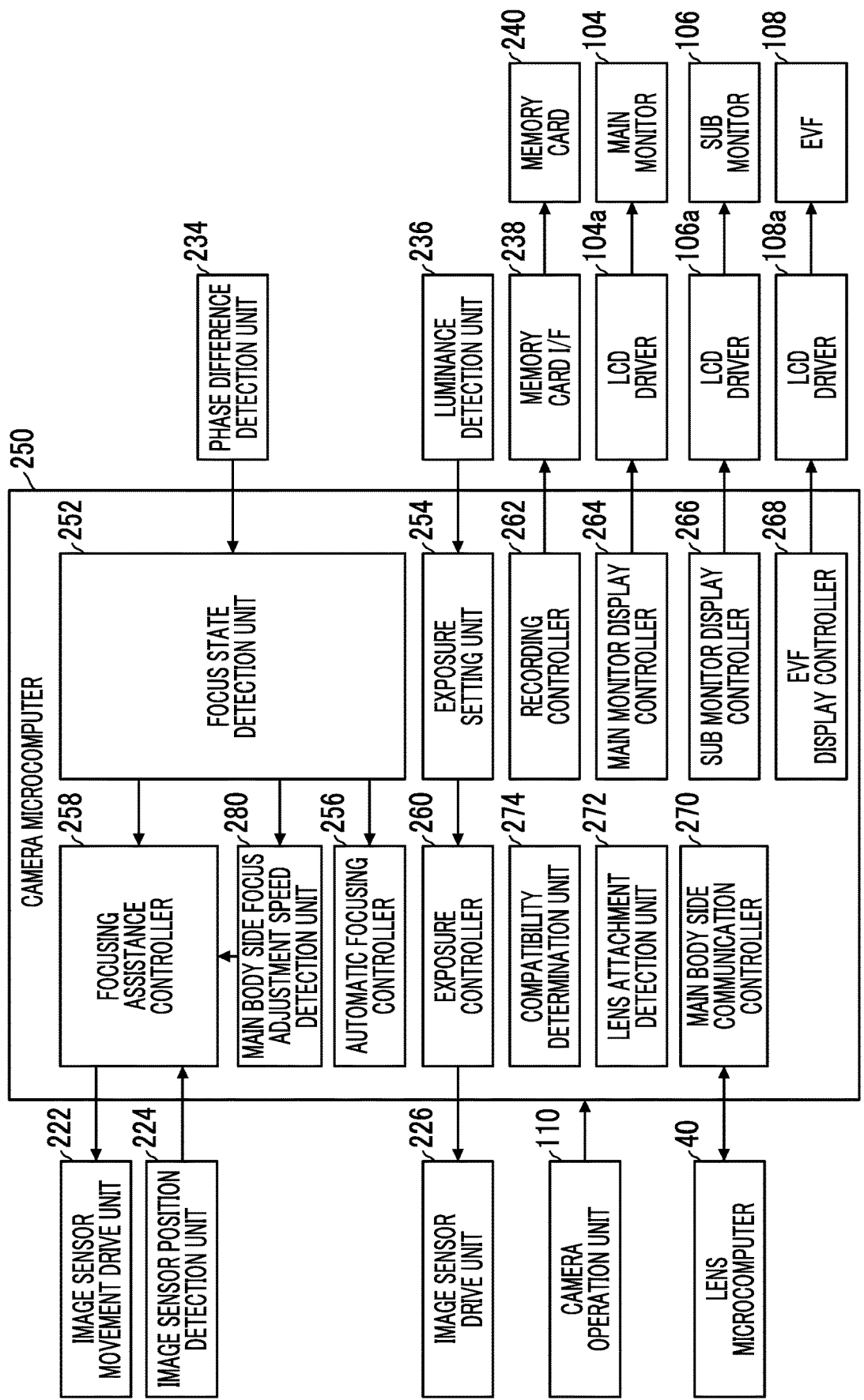
FIG. 15 is a block diagram of main functions realized by a camera microcomputer of a digital camera according to a second embodiment.

FIG. 15 is a block diagram of main functions realized by the camera microcomputer of the digital camera according to the present embodiment.

The functions are the same as those realized by the camera microcomputer 250 of the digital camera according to the first embodiment except that the camera microcomputer further functions as the main body side focus adjustment speed detection unit 280.

The main body side focus adjustment speed detection unit 280 is another example of the focus adjustment speed detection unit. The main body side focus adjustment speed detection unit 280 detects the manual focus adjustment speed based on the change in the focus state detected by the focus state detection unit 252. That is, the focus adjustment speed by the movement of the focus lens group 22 is detected. As described above, the focus state detection unit 252 detects the defocus amount. The main body side focus adjustment speed detection unit 280 detects a change speed of the defocus amount, and detects the manual focus adjustment speed.

In a case where the manual focusing is assisted, the focusing assistance controller 258 brings the focusing assistance unit into the in-focus state by controlling the movement of the image sensor 210 based on the speed detected by the main body side focus adjustment speed detection unit 280.

[Actions]

Figure 16:
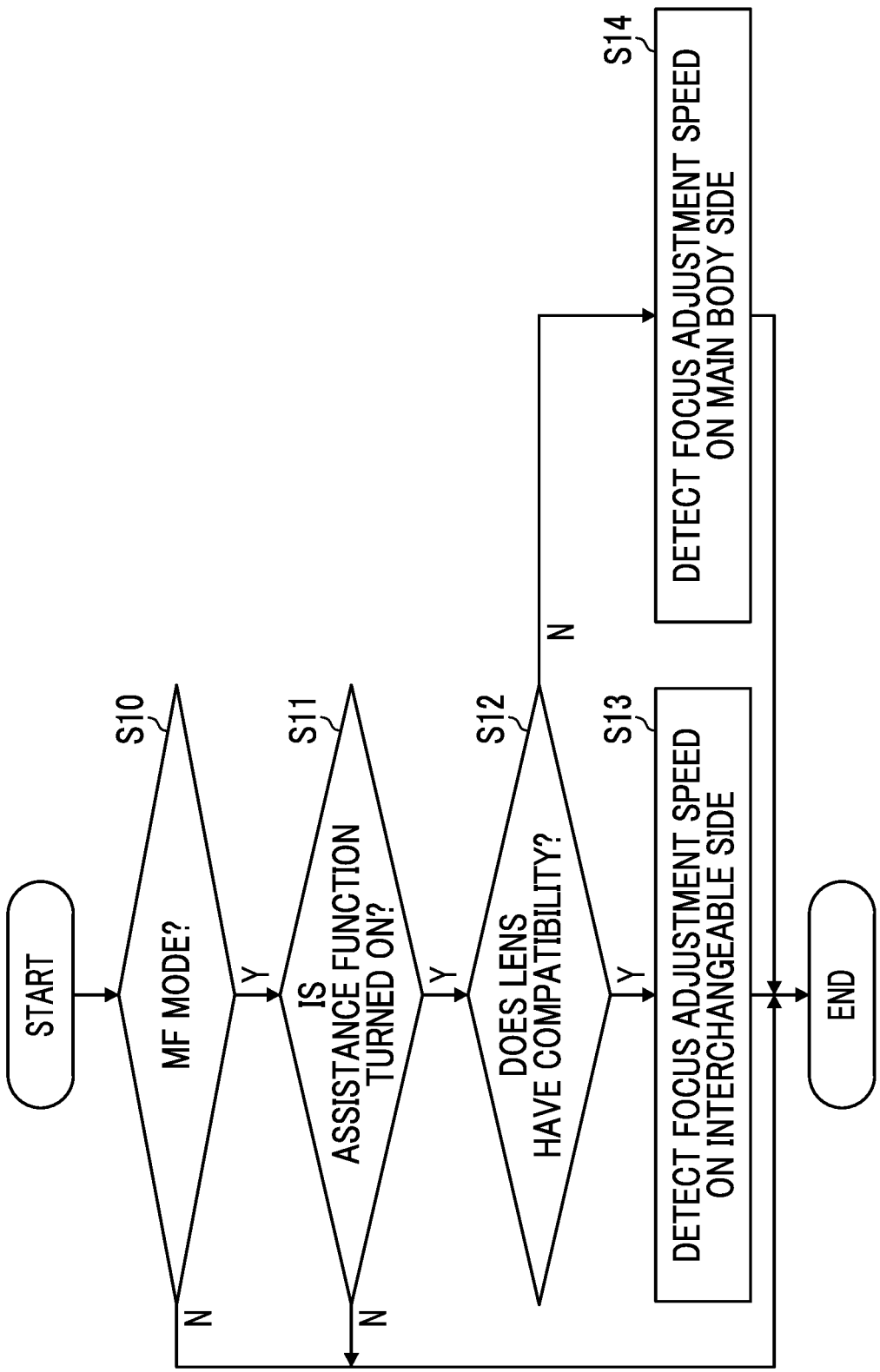
FIG. 16 is a flowchart showing a procedure for setting a method of detecting a focus adjustment speed.

FIG. 16 is a flowchart showing a procedure for setting a method of detecting the focus adjustment speed.

In the digital camera according to the present embodiment, in a case where the interchangeable lens attached to the camera main body is the interchangeable lens having compatibility, the focus adjustment speed is detected on the interchangeable lens side. Meanwhile, in a case where the interchangeable lens attached to the camera main body is the interchangeable lens having no compatibility, the focus adjustment speed is detected on the camera main body side.

The camera microcomputer 250 determines whether or not the focus mode is set to manual focus (step S10).

In a case where the focus mode is set to manual focus, it is determined whether or not the focusing assistance function is turned on (step S11).

In a case where the assistance function for focusing is turned on, it is determined whether or not the interchangeable lens attached to the camera main body is the interchangeable lens having compatibility (step S12).

In the case of the interchangeable lens having compatibility, the setting is performed such that the focus adjustment speed is detected on the lens side provided in the interchangeable lens (step S13). That is, the moving speed of the focus lens group 22 is detected by the lens side focus adjustment speed detection unit 44 provided in the interchangeable lens, and the setting for detecting the manual focus adjustment speed is performed.

Meanwhile, in the case of the interchangeable lens having no compatibility, the setting for detecting the focus adjustment speed is performed by the main body side focus adjustment speed detection unit 280 provided in the camera main body (step S14). That is, the change in the focus state is detected by the main body side focus adjustment speed detection unit 280 provided in the camera main body, and the setting for detecting the manual focus adjustment speed is performed.

In a case where the manual focusing is assisted, the speed of the focus detection is detected by the set detection method, and the assisting processing is performed. An assistance aspect is the same as the aspect described in the first embodiment.

As described above, in accordance with the digital camera according to the present embodiment, the focus adjustment speed can be detected on the camera main body side as necessary. Accordingly, even in a case where the interchangeable lens having no compatibility such as an old lens or a third-party lens is attached, the manual focusing can be appropriately assisted.

Other Embodiments

[Processing after Focusing]

After focusing, it is preferable that the in-focus state is maintained by moving the image sensor 210 within the movable range. In a case where the image sensor 210 reaches an end portion of the movable range, the image sensor may be returned to a reference position, or may stand by at a position of the end portion. In a case where the image sensor is returned to the reference position, it is preferable that the image sensor 210 is moved according to the change speed of the focus. Accordingly, the image sensor 210 can be returned to an origin position without giving an uncomfortable feeling to the user.

In a case where the in-focus state is released after being brought into the in-focus state by the assistance, the assistance is performed in a case where the condition is satisfied again.

[Movable Range of Image Sensor]

The movable range of the image sensor 210 is optionally set within a mechanical operation range of the image sensor movement drive unit 222. For example, in a case where the image sensor movement drive unit 222 is a piezo actuator, the movable range of the image sensor 210 is optionally set within the mechanical operation range of the piezo actuator. As the movable range of the image sensor 210 becomes wider, the range of the focus adjustment executable on the camera main body side becomes wider.

As in the digital camera of the aforementioned embodiment, in a case where the focus is adjusted by using the main monitor 104 or the electronic viewfinder 108, it is preferable that the movable range of the image sensor 210 is set with consideration for the resolution of the main monitor 104 and the electronic viewfinder 108. In a case where the resolution of the main monitor 104 and the electronic viewfinder 108 is lower than the resolution of the image sensor 210, the accuracy capable of being adjusted on the main monitor 104 and the electronic viewfinder 108 is limited. Therefore, it is preferable that the movable range is set such that the range that cannot be adjusted can be covered by the movement of the image sensor 210 in the main monitor 104 and the electronic viewfinder 108. Specifically, it is preferable that the movable range equal to or greater than a pixel pitch of the main monitor 104 and the electronic viewfinder 108 is secured. Accordingly, even though the focus is adjusted by using the main monitor 104 or the electronic viewfinder 108 having a low resolution, the target subject can be focused with high accuracy.

[Reference Position of Image Sensor]

Although it has been described in the aforementioned embodiment that the reference position of the image sensor 210 is set at the center of the movable range, the position set as the reference position is not limited thereto. For example, the reference position may be set at a position on the subject side (front side) from the center of the movable range, or the reference position may be set at a position on the image plane side (rear side). The user may set any position.

Although it has been described in the aforementioned embodiment that the reference position is set at the position of the flange back, the reference position may be set at a position different from the flange back. As described above, it is possible to maximize the optical performance of the interchangeable lens 10 in the case of performing the focusing at the reference position by setting the reference position at the flange back position.

[Focus State Detection Unit]

Although it has been described in the aforementioned embodiment that the phase difference is detected based on the output of the phase difference detection pixel 218 provided on the imaging surface 212 of the image sensor 210 and the defocus amount is detected based on the detected phase difference, a unit that detects the defocus amount is not limited thereto. A known focus detection unit such as a passive method or an active method can be employed.

[Image Sensor Movement Drive Unit]

Although it has been described in the aforementioned embodiment that the image sensor 210 is moved along the optical axis L by using the piezo actuator, the configuration of the image sensor movement drive unit is not limited thereto. The image sensor 210 can be moved by using a known linear-motion-type drive mechanism such as a linear motor or a leadscrew mechanism.

[Imaging Unit]

Although it has been described in the aforementioned embodiment that the present invention is applied to a single-sensor digital camera has been described as an example, the present invention can also be applied to a multi-sensor camera.

Figure 17:
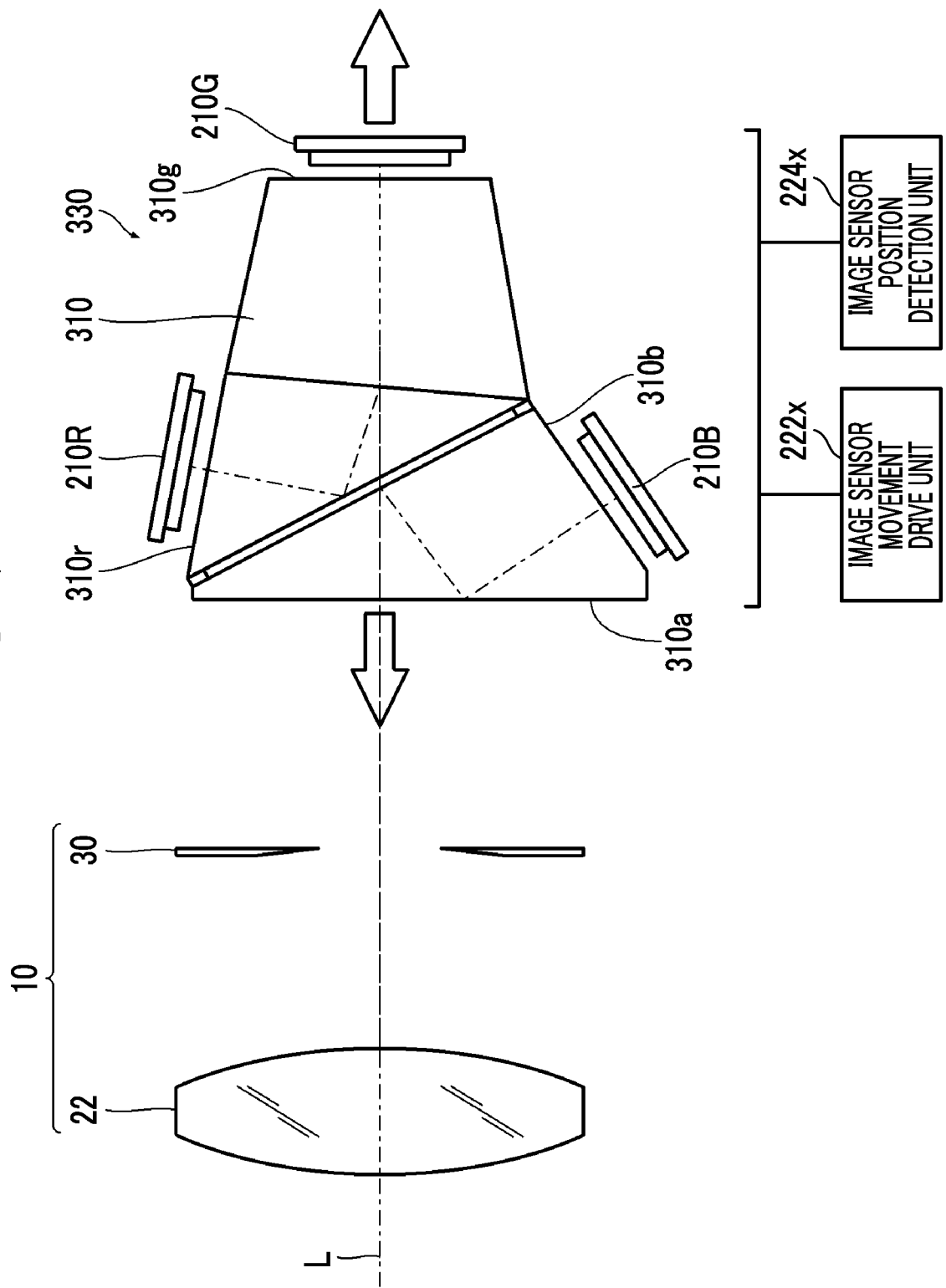
FIG. 17 is a diagram showing an example in a case where the present invention is applied to a three-sensor digital camera.

FIG. 17 is a diagram showing an example in a case where the present invention is applied to a three-sensor digital camera.

As shown in this diagram, the three-sensor digital camera includes a color separation prism 310 and three image sensors 210R, 210G, and 210B in the imaging unit.

The color separation prism 310 separates light incident on an incident surface 310a into light rays of three colors of red (R) light, green (G) light, and blue (B) light. The separated light rays of the three colors are emitted from an R light exit surface 310r, a G light exit surface 310g, and a B light exit surface 310b, respectively.

The three image sensors include an image sensor 210R that receives R light, an image sensor 210G that receives G light, and an image sensor 210B that receives B light.

The image sensor 210R that receives the R light is disposed so as to face the R light exit surface 310r, and receives the R light emitted from the R light exit surface 310r.

The image sensor 210G that receives the G light is disposed so as to face the G light exit surface 310g, and receives the G light emitted from the G light exit surface 310g.

The image sensor 210B that receives the B light is disposed so as to face the B light exit surface 310b, and receives the B light emitted from the B light exit surface 310b.

The three image sensors 210R, 210G, and 210B are arranged at positions at which optical path lengths from the incident surface 310a of the color separation prism 310 are identical.

The three image sensors 210R, 210G, and 210B are integrally attached to the color separation prism 310 via a holder (not shown). A unit in which the image sensors 210R, 210G, and 210B are integrally attached to the color separation prism 310 is referred to as an imaging unit 330. An image sensor movement drive unit 222x moves the imaging unit 330 back and forth along the optical axis L. An image sensor position detection unit 224x detects a position of the imaging unit 330 relative to the reference position.

[Imaging Lens]

Although it has been described in the aforementioned embodiment that the focus is adjusted by moving the focus lens back and forth along the optical axis, a focus adjustment mechanism of the imaging lens is not limited thereto. A liquid lens or a liquid crystal lens can be used as the focus lens. In the liquid lens and the liquid crystal lens, the focus is adjusted by using a change in refractive index.

Although it has been described in the aforementioned embodiment that the focus lens is driven by the actuator such as a linear motor, the focus lens may be manually moved by using a cam mechanism or a helicoid gear.

Although it has been described in the aforementioned embodiments that the focus is adjusted by operating the focus ring 16 provided in the interchangeable lens 10, an operation unit for the focus adjustment is not limited thereto. The focus adjustment operation may be performed by the operation unit provided in the camera main body.

[Imaging Device]

Although it has been described in the aforementioned embodiment that the present invention is applied to the digital camera, the application of the present invention is not limited thereto. For example, the present invention can be applied to a video camera, a television camera, and a cinema camera, and can be similarly applied to electronic devices (for example, a mobile phone, a smartphone, a tablet personal computer, and a laptop personal computer) having an imaging function.

In the above-described embodiment, the case where the present invention is applied to an interchangeable lens type digital camera has been described as an example. However, the present invention can be similarly applied to a camera in which an imaging lens is integrated in a camera main body.

The camera microcomputer 250 may perform various processing performed by the lens microcomputer 40. For example, the camera microcomputer 250 may perform drive control of the focus lens group 22 and drive control of the stop 30.

[Others]

Although it has been described in the aforementioned embodiments that the function of the focusing assistance controller is realized by the microcomputer, the hardware configuration for realizing the functions is not limited thereto. These functions can be realized by various processors. A CPU which is a general-purpose processor functioning as a processing unit that performs various processing by executing software (program) and a dedicated electric circuit which is a processor having a circuit configuration designed as a dedicated circuit in order to perform specific processing such as programmable logic device (PLD) and application specific integrated circuit (ASIC) of which a circuit configuration can be changed after field-programmable gate array (FPGA) is manufactured are included in the various processors. The medium in which the predetermined program (focusing assistance program) is stored may be a non-transitory computer-readable recording medium such as a hard disk, a compact disk (CD), a digital versatile disk (DVD), and various semiconductor memories.

One processing unit may be constituted by one of these various processors, or may be constituted by two or more processors of the same type or different types. For example, one processing unit may be constituted by a plurality of FPGAs or a combination of a CPU and FPGA.

A plurality of processing units may be constituted by a single processor. As an example in which the plurality of processing units is constituted by one processor, there is a first example in which one processor is constituted by a combination of one or more CPUs and software or one processor functions as the plurality of processing units as represented by a computer such as a client or server. There is a second example in which as represented by system on chip (SoC), a processor that realizes the functions of the entire system including the plurality of processing units by a single integrated circuit (IC) chip is used. As described above, the various processing units are constituted by using one or more of the various processors as a hardware structure.

The hardware structures of these various processors are more specifically electric circuits in which circuit elements such as semiconductor elements are combined.

EXPLANATION OF REFERENCES

1: digital camera
10: interchangeable lens
12: lens barrel
14: lens operation unit
16: focus ring
18: stop ring
20: lens side focus adjustment mechanism
22: focus lens group
24: focus lens drive unit
26: focus lens position detection unit
30: stop
32: stop drive unit
40: lens microcomputer
42: focus lens controller
44: lens side focus adjustment speed detection unit
46: stop controller
48: lens side communication controller
100: camera main body
102: main body side mount
104: main monitor
104a: LCD driver
106: sub monitor
106a: LCD driver
108: electronic viewfinder
108a: LCD driver
110: camera operation unit
111: sensitivity dial
112: delete button
113: power lever
114: shutter button
115: drive button
116: sub monitor illumination button
117: shutter speed dial
118: playback button
119: front command dial
120: rear command dial
121: focus lever
122: quick menu button
123: OK button
124: selector button
125: display/BACK button
126: first function button
127: second function button
128: third function button
129: fourth function button
130: fifth function button
132: focus mode switching lever
210: image sensor
210B: image sensor
210G: image sensor
210R: image sensor
212: imaging surface
214: AF area
216: normal pixel
218: phase difference detection pixel
218A: first phase difference detection pixel
218B: second phase difference detection pixel
220: focusing assistance unit
222: image sensor movement drive unit
222x: image sensor movement drive unit
224: image sensor position detection unit
224x: image sensor position detection unit
226: image sensor drive unit
228: analog signal processing unit
230: ADC
232: digital signal processing unit
234: phase difference detection unit
236: luminance detection unit
238: memory card interface
240: memory card
250: camera microcomputer
252: focus state detection unit
254: exposure setting unit
256: automatic focusing controller
258: focusing assistance controller
260: exposure controller
262: recording controller
264: main monitor display controller
266: sub monitor display controller
268: EVF display controller
270: main body side communication controller
272: lens attachment detection unit
274: compatibility determination unit
280: main body side focus adjustment speed detection unit
310: color separation prism
310a: incident surface
310b: B light exit surface
310g: G light exit surface
310r: R light exit surface
330: imaging unit
L: optical axis
D: graph showing change in defocus amount
Dth: prescribed value of defocus amount
Vth: threshold value of manual focus adjustment speed
VL: graph showing change in manual focus adjustment speed
VLAv: graph showing change in average value of manual focus adjustment speed
PL: graph showing change in position of focus lens group
PO: position of focus lens group that focuses on subject
Pt: point at which manual focus adjustment speed is equal to or less than threshold value and defocus amount is equal to or less than prescribed value
S1 to S5: procedure of focusing assistance
S5a to S5f: procedure for focusing assistance processing
S10 to S14: procedure for setting method of detecting focus adjustment speed

What is claimed is:

1. An imaging device comprising:
an imaging lens that is capable of adjusting a focus;
an image sensor;
a focusing assistance unit that assists focusing by moving the image sensor;
a focus adjustment speed detection unit that detects a focus adjustment speed by the imaging lens, wherein the focus adjustment speed by the imaging lens is detected as a moving speed of a focus lens group that moves by focus adjustment;

a focus state detection unit that detects a focus state; and a focusing assistance controller that brings the focusing assistance unit into an in-focus state by controlling the focusing assistance unit based on a detection result of the focus state detection unit in response to the focus adjustment speed by the imaging lens being reduced to a threshold value or less, the focusing assistance controller bringing the focusing assistance unit into the in-focus state by setting a sum of the focus adjustment speed by the imaging lens and a focus adjustment speed by movement of the image sensor to a speed equal to or less than the threshold value.

2. The imaging device according to claim 1, wherein the focusing assistance controller brings the focusing assistance unit into the in-focus state by maintaining the sum of the focus adjustment speed by the imaging lens and the focus adjustment speed by the movement of the image sensor at a speed of the threshold value.

3. The imaging device according to claim 1, wherein the focusing assistance controller brings the focusing assistance unit into the in-focus state by gradually decreasing the sum of the focus adjustment speed by the imaging lens and the focus adjustment speed by the movement of the image sensor.

4. The imaging device according to claim 3, wherein the focusing assistance controller brings the focusing assistance unit into the in-focus state by monotonically decreasing the sum of the focus adjustment speed by the imaging lens and the focus adjustment speed by the movement of the image sensor.

5. The imaging device according to claim 1, wherein the focusing assistance controller brings the focusing assistance unit into the in-focus state by controlling the focusing assistance unit based on the detection result of the focus state detection unit in response to an average value of the focus adjustment speed by the imaging lens being reduced to the threshold value or less.

6. The imaging device according to claim 1, wherein the focus state detection unit detects a defocus amount, and in response to the focus adjustment speed by the imaging lens being reduced to the threshold value or less and the defocus amount detected by the focus state detection unit becomes equal to or less than a prescribed value, the focusing assistance controller brings the focusing assistance unit into the in-focus state by controlling the focusing assistance unit based on the detection result of the focus state detection unit.

7. The imaging device according to claim 6, wherein, in response to the defocus amount detected by the focus state detection unit becoming equal to or less than the prescribed value after the focus adjustment speed by the imaging lens becomes equal to or less than the threshold value, the focusing assistance controller brings the focusing assistance unit into the in-focus state by setting the sum of the focus adjustment speed by the imaging lens and the focus adjustment speed by the movement of the image sensor to a speed equal to or less than the speed detected by the focus adjustment speed detection unit in response to the defocus amount detected by the focus state detection unit reaching the prescribed value.

8. The imaging device according to claim 7, wherein the focusing assistance controller brings the focusing assistance unit into the in-focus state by gradually decreasing the sum of the focus adjustment speed by the imaging lens and the focus adjustment speed by the movement of the image sensor.

9. The imaging device according to claim 8, wherein the focusing assistance controller brings the focusing assistance unit into the in-focus state by monotonically decreasing the sum of the focus adjustment speed by the imaging lens and the focus adjustment speed by the movement of the image sensor.

10. The imaging device according to claim 1, wherein the image sensor comprises a phase difference detection pixel on an imaging surface, and the focus state detection unit detects the focus state based on a phase difference calculated based on a signal obtained from the phase difference detection pixel.

11. The imaging device according to claim 1, wherein the focus adjustment speed detection unit detects the focus adjustment speed by the imaging lens based on a change in focus state detected by the focus state detection unit.

12. The imaging device according to claim 1, wherein the imaging lens is attachable to and detachable from a main body.

13. A focusing assistance method of an imaging device comprising:

a step of detecting a focus state;

a step of detecting a focus adjustment speed by an imaging lens, wherein the focus adjustment speed by the imaging lens is detected as a moving speed of a focus lens group that moves by focus adjustment; and a step of bringing a focusing assistance unit into an in-focus state by controlling movement of an image sensor based on a detection result of a focus state in response to the focus adjustment speed by the imaging lens being reduced to a threshold value or less, the focusing assistance unit being brought into the in-focus state by setting a sum of the focus adjustment speed by the imaging lens and a focus adjustment speed by the movement of the image sensor to a speed equal to or less than the threshold value.

14. A non-transitory computer-readable recording medium causing a computer to realize a focusing assistance function of an imaging device in a case where a command stored in the recording medium is read by the computer, the focusing assistance function comprising:

a function of acquiring a detection result of a focus state;

a function of acquiring a detection result of a focus adjustment speed by an imaging lens; and a function of bringing a focusing assistance unit into an in-focus state by controlling movement of an image sensor based on the detection result of the focus state in a case where the focus adjustment speed by the imaging lens is reduced to a threshold value or less, the focusing assistance unit being brought into the in-focus state by setting a sum of the focus adjustment speed by the imaging lens and a focus adjustment speed by the movement of the image sensor to a speed equal to or less than the threshold value.

* * * * *